(12) United States Patent  
Isobe et al.

(10) Patent No.: US 11,931,215 B2
(45) Date of Patent: Mar. 19, 2024

(54) PLATE DENTURE MANUFACTURING METHOD, DENTURE MOLD, AND PLATE DENTURE MANUFACTURING KIT

(71) Applicant: DGSHAPE Corporation, Hamamatsu (JP)

(72) Inventors: Sachino Isobe, Hamamatsu (JP); Koji Saito, Hamamatsu (JP)

(73) Assignee: DGSHAPE CORPORATION, Shizuoka (JP)

( * ) Notice: Subject to any disclaimer, the term of this patent is extended or adjusted under 35 U.S.C. 154(b) by 260 days.

(21) Appl. No.: 17/579,847

(22) Filed: Jan. 20, 2022

(65) Prior Publication Data

US 2022/0233288 A1 Jul. 28, 2022

(30) Foreign Application Priority Data

Jan. 26, 2021 (JP) .................. 2021-010273

(51) Int. Cl.
*A61C 13/00* (2006.01)
*A61C 13/01* (2006.01)
*A61C 13/087* (2006.01)
*A61C 13/10* (2006.01)

(52) U.S. Cl.
CPC ...... *A61C 13/0006* (2013.01); *A61C 13/0004* (2013.01); *A61C 13/04* (2013.01); *A61C 13/087* (2013.01); *A61C 13/1003* (2013.01)

(58) Field of Classification Search
None
See application file for complete search history.

(56) References Cited

U.S. PATENT DOCUMENTS

2021/0015592 A1 * 1/2021 Kanazawa ............ B29C 66/032

FOREIGN PATENT DOCUMENTS

| EP | 3 517 073 A | * | 7/2019 |
| EP | 3 517 073 A1 | | 7/2019 |
| EP | 3 698 751 A1 | | 8/2020 |
| JP | 2020-130570 A | | 8/2020 |
| WO | 2019/189649 A1 | | 10/2019 |

OTHER PUBLICATIONS

Official Communication issued in corresponding European Patent Application No. 22152924.1, dated Jul. 8, 2022.

* cited by examiner

*Primary Examiner* — Mohammad M Ameen
(74) *Attorney, Agent, or Firm* — Keating & Bennett, LLP

(57) ABSTRACT

A plate denture manufacturing method includes preparing three-dimensional data for an artificial tooth impression and a plate denture, preparing a denture mold including a bottom wall, a side wall, a forming space which is surrounded by the bottom wall and the side wall and into which a denture base material is to be poured, a cutting target region to be cut by a cutting apparatus, and vent holes passing through the bottom wall, cutting a groove in the cutting target region using the cutting apparatus, placing the denture mold on a holder, placing an artificial tooth in the groove, pouring the denture base material into the forming space and curing the denture base material so as to fabricate a one-piece product including the denture mold, the artificial tooth, and a cured product of the denture base material that are integral with each other, and machining the cured product.

13 Claims, 21 Drawing Sheets

PLATE DENTURE MANUFACTURING METHOD, DENTURE MOLD, AND PLATE DENTURE MANUFACTURING KIT

CROSS REFERENCE TO RELATED APPLICATIONS

This application claims the benefit of priority to Japanese Patent Application No. 2021-010273 filed on Jan. 26, 2021. The entire contents of this application are incorporated herein by reference.

BACKGROUND OF THE INVENTION

1. Field of the Invention

The present invention relates to plate denture manufacturing methods, denture molds, and plate denture manufacturing kits.

2. Description of the Related Art

To replace missing teeth of patients, plate dentures each including a denture base and artificial teeth placed on the denture base have conventionally been used. With the introduction of computer-aided design (CAD) and computer-aided manufacturing (CAM) techniques in recent years, denture bases are now being mechanically fabricated using cutting apparatuses in accordance with computer-designed cutting data. Fabrication of plate dentures in accordance with three-dimensional data known in the related art first involves, for example, cutting materials (e.g., dental resin materials) into desired shapes so as to make denture bases, and then involves bonding separately prepared artificial teeth to the denture bases.

The process of bonding artificial teeth to denture bases is still usually performed manually by dental technicians. In other words, dental technicians typically bond artificial teeth to denture bases with adhesives or polymerizable materials one at a time in a step-by-step manner. The process of bonding artificial teeth to denture bases one at a time unfortunately requires considerable time and effort when the number of artificial teeth to be bonded is large (e.g., when a complete denture is to be fabricated). Dental technicians need to perform positioning of artificial teeth with respect to opposing teeth in bonding the artificial teeth. Such positioning requires sophisticated skills, imposing immense burdens on the dental technicians. The resulting plate dentures may thus vary in quality depending on the skills of the dental technicians. To solve these problems, JP 2020-130570 A discloses a technique for manufacturing a one-piece structure including a denture base and artificial teeth.

The method disclosed in JP 2020-130570 A involves pouring a denture base material into a dedicated denture mold so as to manufacture a one-piece structure including a denture base and artificial teeth. In this case, however, relatively many bubbles may be produced in the denture base material during polymerization depending on the type of denture base material used. If polymerization proceeds, with bubbles present in the denture base material, the denture base material may shrink to a relatively great degree, and the resulting cured product, which is the cured denture base material, may crack. The cracked cured product is low in strength and thus cannot be used to fabricate a plate denture.

SUMMARY OF THE INVENTION

Accordingly, preferred embodiments of the present invention provide methods for manufacturing plate dentures with reduced or no cracks or bubbles.

According to a preferred embodiment of the present invention, a method for manufacturing a plate denture including a denture base and an artificial tooth placed on the denture base. The manufacturing method includes a three-dimensional data preparing step, a denture mold preparing step, a denture mold cutting step, a denture mold placing step, an artificial tooth placing step, a denture base material curing step, and a one-piece product machining step. The three-dimensional data preparing step includes preparing three-dimensional data for an artificial tooth impression that is an impression for the artificial tooth to be placed on the denture base, and three-dimensional data for the plate denture. The denture mold preparing step includes preparing a denture mold including a bottom wall, a side wall extending upward from the bottom wall, a forming space which is surrounded by the bottom wall and the side wall and into which a denture base material is to be poured, a retained portion disposed on the side wall and to be directly or indirectly attached to a cutting apparatus, a cutting target region located in the bottom wall and to be cut by the cutting apparatus so as to define a groove for the artificial tooth, and a plurality of vent holes defined in the bottom wall, passing through the bottom wall in an up-down direction, and in communication with the forming space. The denture mold cutting step includes directly or indirectly attaching the denture mold to the cutting apparatus through the retained portion, and cutting the groove in the cutting target region in accordance with the three-dimensional data for the artificial tooth impression. The denture mold placing step includes placing the grooved denture mold on a holder so as to close the vent holes, the holder being higher in gas permeability than the denture mold. The artificial tooth placing step includes placing the artificial tooth in the groove. The denture base material curing step includes pouring the denture base material into the forming space, with the artificial tooth placed in the groove, and curing the denture base material so as to fabricate a one-piece product including the denture mold, the artificial tooth, and a cured product of the denture base material that are integral with each other. The one-piece product machining step includes directly or indirectly attaching the one-piece product to the cutting apparatus through the retained portion, and machining the cured product in accordance with the three-dimensional data for the plate denture.

According to a preferred embodiment of the present invention, a manufacturing method includes placing, on the holder, the denture mold including the vent holes, thus closing the vent holes with the holder. The manufacturing method then includes pouring the denture base material into the forming space of the denture mold. Because the denture mold is provided with the vent holes, the denture base material may flow out of the denture mold through the vent holes. However, closing the vent holes with the holder prevents the denture base material, which has been poured into the forming space, from flowing out of the denture mold. Bubbles may be produced during curing of the denture base material poured into the forming space. Because the holder is higher in gas permeability than the denture mold, the bubbles (or gas) produced in the denture base material are discharged out of the denture mold through the vent holes and the holder. The bubbles produced during curing of the denture base material are thus discharged out of the denture base material. Consequently, the denture mold is brought into more intimate contact with the denture base material so as to limit or prevent shrinkage of the denture base material, which as a result reduces or prevents occurrence of cracks or bubbles in the denture base material that has been cured.

Another preferred embodiment of the present invention provides a denture mold for manufacture of a plate denture including a denture base and an artificial tooth placed on the denture base. The denture mold includes a bottom wall, a side wall extending upward from the bottom wall, a forming space which is surrounded by the bottom wall and the side wall and into which a denture base material is to be poured, and a retained portion disposed on the side wall and to be directly or indirectly attached to a cutting apparatus. The bottom wall includes a cutting target region to be cut by the cutting apparatus so as to define a groove for the artificial tooth, and a plurality of vent holes passing through the bottom wall in an up-down direction and in communication with the forming space.

The denture mold disclosed herein is brought into more intimate contact with the denture base material so as to limit or prevent shrinkage of the denture base material, which as a result reduces or prevents occurrence of cracks or bubbles in the denture base material that has been cured.

Various preferred embodiments of the present invention provide manufacturing methods, denture molds, and plate denture manufacturing kits that are each able to manufacture plate dentures with reduced or no cracks or bubbles.

The above and other elements, features, steps, characteristics, and advantages of the present invention will become more apparent from the following detailed description of the preferred embodiments with reference to the attached drawings.

DETAILED DESCRIPTION OF THE PREFERRED EMBODIMENTS

Figure 1:
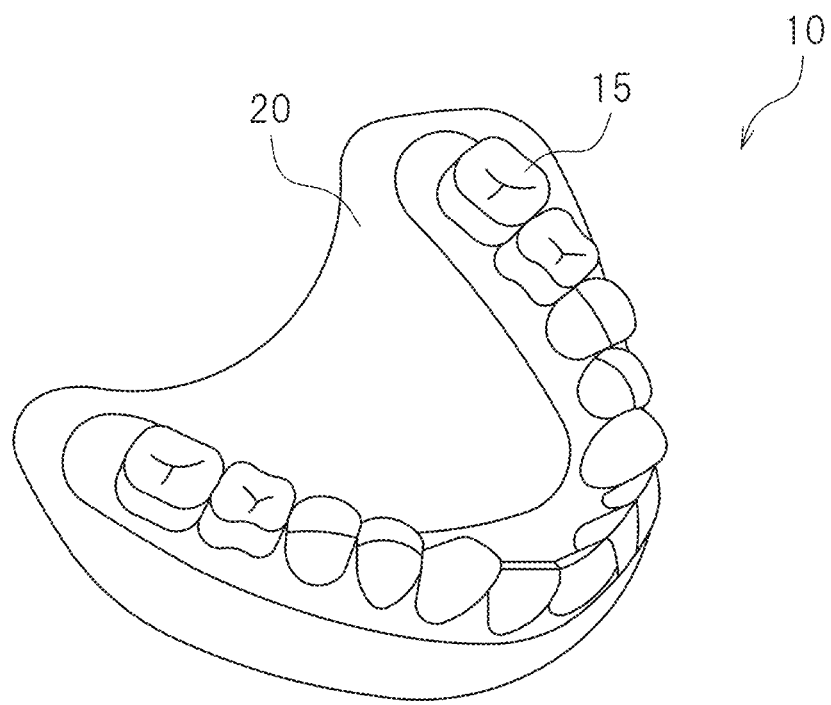
FIG. 1 is a perspective view of a plate denture according to a first preferred embodiment of the present invention.

Plate denture manufacturing methods, denture molds, and plate denture manufacturing kits according to preferred embodiments of the present invention will be described below with reference to the drawings. The preferred embodiments described below are naturally not intended to limit the present invention in any way. Components or elements having the same functions are identified by the same reference signs, and description thereof will be omitted or simplified when redundant. The reference signs F, Rr, L, R, U, and D in the drawings respectively represent front, rear, left, right, up, and down. These directions are defined for the sake of convenience of description and do not limit the present invention in any way.

First Preferred Embodiment

A first preferred embodiment of the present invention will now be described. FIG. 1 is a perspective view of a plate denture 10 according to the first preferred embodiment. The plate denture 10 is a complete denture (or full denture) for the upper jaw of a patient. The plate denture 10 includes a denture base 20 and artificial teeth 15 placed on the denture base 20. The artificial teeth 15 are bonded to the denture base 20. FIG. 1 illustrates the plate denture 10 flipped over such that the artificial teeth 15 face upward, although the patient wears the plate denture 10, with the artificial teeth 15 facing downward. In the present preferred embodiment, the number of artificial teeth 15 is 14 in total, for example. The artificial teeth 15 are made of, for example, any of various materials, such as polymethyl methacrylate (PMMA) resin, zirconia, glass ceramics, glass fiber, polyether ether ketone (PEEK) resin, and hybrid resin. The artificial teeth 15 may be in the form of a dental bridge including two or more artificial teeth integral with each other. The denture base 20 is made of, for example, a denture base material, such as a dental resin material or a dental ceramic material. A method for manufacturing the plate denture 10 will be described below by way of example.

Figure 2:
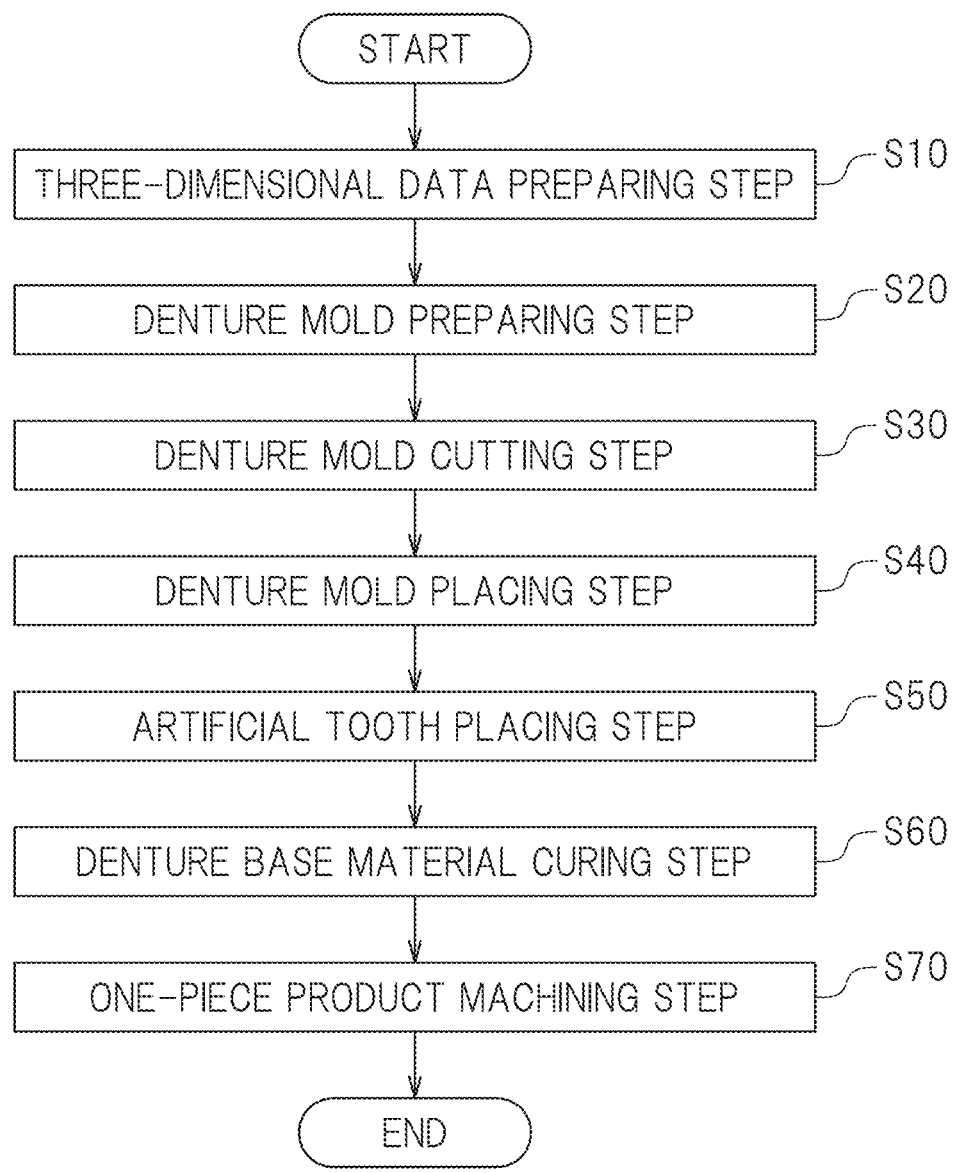
FIG. 2 is a flow chart illustrating a plate denture manufacturing method according to the first preferred embodiment of the present invention.

FIG. 2 is a flow chart illustrating the method for manufacturing the plate denture 10. The manufacturing method according to the present preferred embodiment includes a three-dimensional data preparing step (step S10), a denture mold preparing step (step S20), a denture mold cutting step (step S30), a denture mold placing step (step S40), an artificial tooth placing step (step S50), a denture base material curing step (step S60), and a one-piece product machining step (step S70). Any other step may be performed at any time during execution of the method. The three-dimensional data preparing step (step S10) and the denture mold preparing step (step S20) may be performed in reverse order. The denture mold placing step (step S40) and the artificial tooth placing step (step S50) may be performed in reverse order. The steps of the manufacturing method will be described in detail below.

The three-dimensional data preparing step (step S10) includes preparing at least one or two types of three-dimensional data. Examples of the three-dimensional data include standard triangulated language (STL) data. The three-dimensional data preparing step (step S10) includes a first STL data preparing step (sub-step S11) and a second STL data preparing step (sub-step S12). The STL data is created by, for example, a computer-aided design (CAD) device. The functions of the CAD device may be implemented by software or hardware. Examples of CAD software include a 3Shape Dental System™ available from 3Shape.

Figure 3:
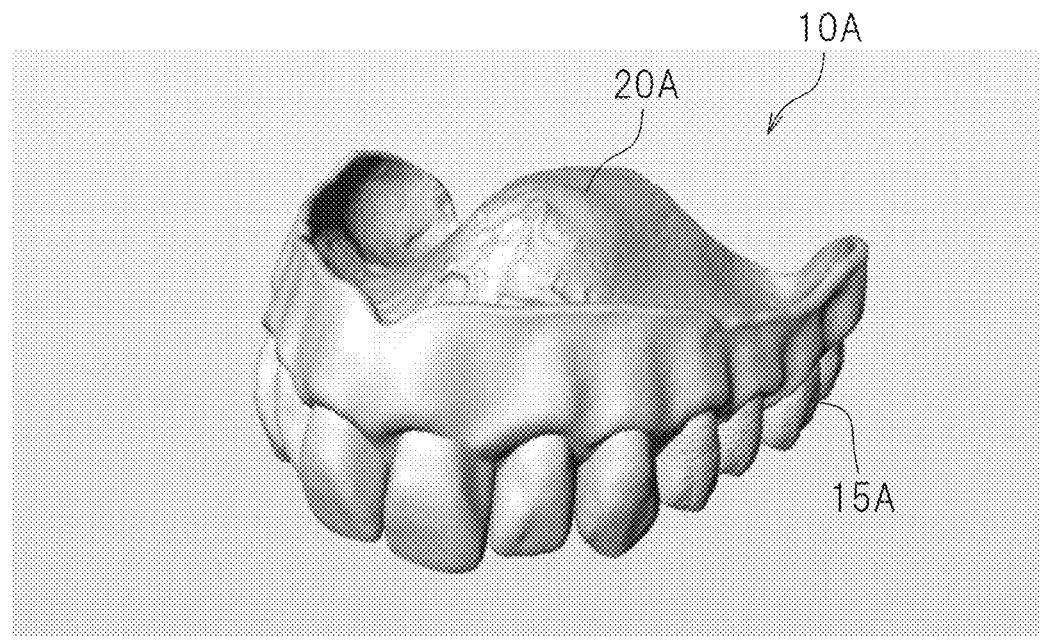
FIG. 3 illustrates standard triangulated language (STL) data for the plate denture according to the first preferred embodiment of the present invention.

Sub-step S11 includes preparing first STL data. The first STL data is STL data 10A representing the plate denture 10 (hereinafter referred to as "STL data 10A for the plate denture 10"). The STL data 10A for the plate denture 10 is used when a one-piece product 13 is cut in step S70 (which will be described below). FIG. 3 illustrates an example of the STL data 10A for the plate denture 10. The STL data 10A for the plate denture 10 includes STL data 20A that represents the denture base 20, and STL data 15A that represents the artificial teeth 15 placed on the denture base 20. The STL data 10A for the plate denture 10 is usually created for each patient. Depending on, for example, usage or other factors, commercially available simulated STL data for the plate denture 10 may be used on an as-is basis.

Figure 4:
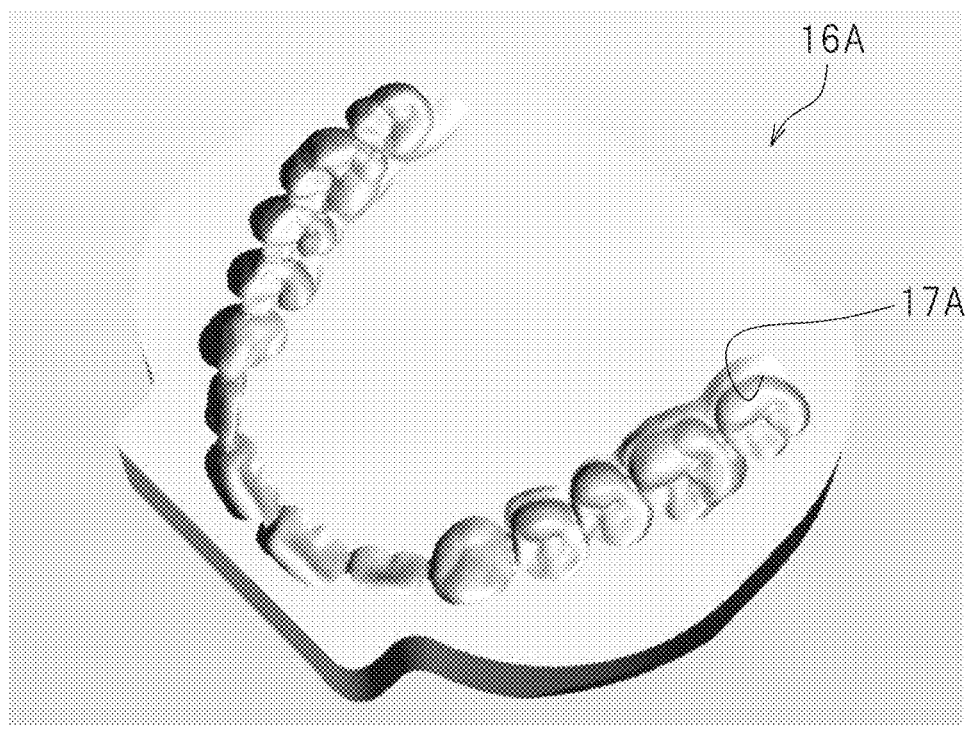
FIG. 4 illustrates STL data for an artificial tooth impression according to the first preferred embodiment of the present invention.

Sub-step S12 includes preparing second STL data. The second STL data is STL data 16A for an artificial tooth impression 46. The STL data 16A for the artificial tooth impression 46 represents the alignment (or row) of the artificial teeth 15. The STL data 16A for the artificial tooth impression 46 is used when a denture mold 40 is cut in step S30 (which will be described below). In other words, the STL data 16A for the artificial tooth impression 46 is used to form the artificial tooth impression 46 (see FIG. 16) for placement of the artificial teeth 15 on the denture mold 40. FIG. 4 illustrates an example of the STL data 16A for the artificial tooth impression 46. The STL data 16A for the artificial tooth impression 46 includes STL data 17A for a plurality of grooves 46A (see FIG. 16). The STL data 17A for the grooves 46A is reflective of, for example, the sizes, locations, and orientations of the artificial teeth 15 to be placed in the grooves 46A. The artificial tooth impression 46 includes the grooves 46A. The STL data 16A for the artificial tooth impression 46 is indicative of all of the artificial teeth 15 included in the plate denture 10. In the present preferred embodiment, the number of artificial teeth 15 is 14 in total, for example. The STL data 16A for the artificial tooth impression 46 is typically created in accordance with the STL data 10A for the plate denture 10. The STL data 10A for the plate denture 10 and the STL data 16A for the artificial tooth impression 46 include similar information that indicates the locations of the artificial teeth 15.

Figure 5:
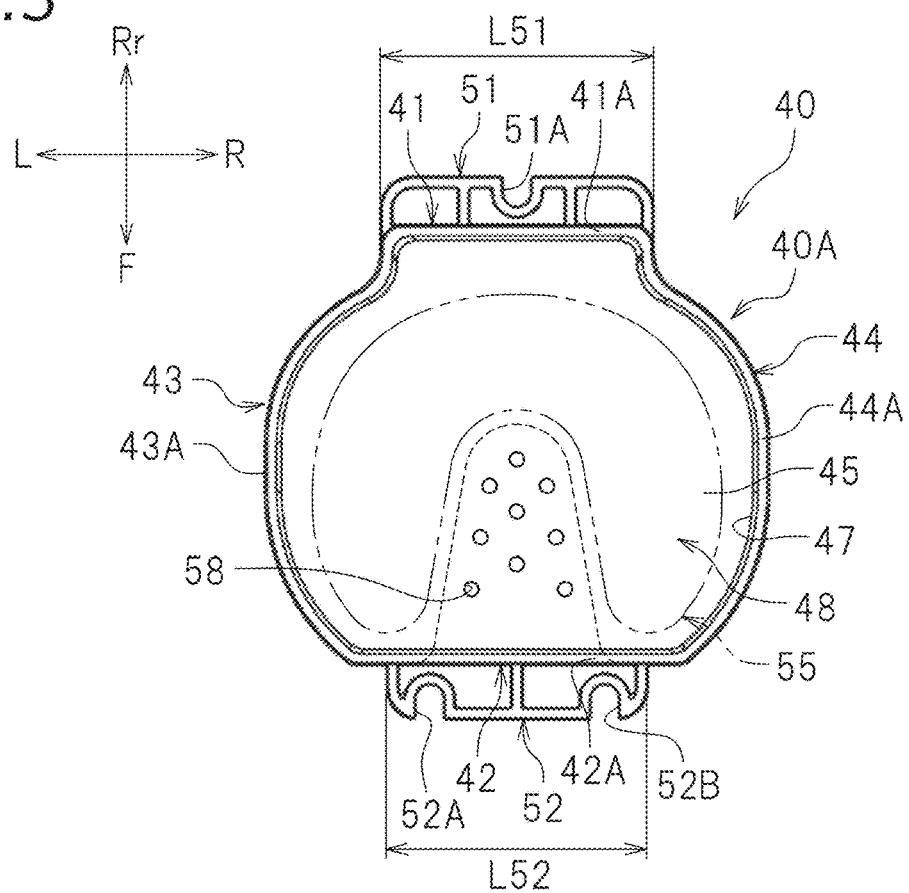
FIG. 5 is a top view of a denture mold according to the first preferred embodiment of the present invention.
Figure 6:
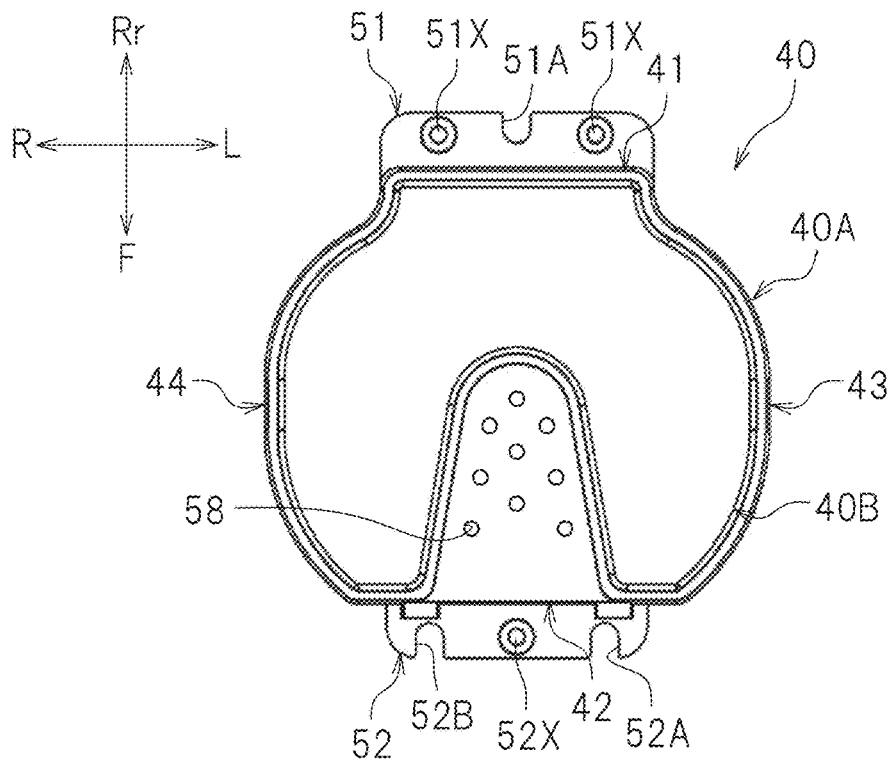
FIG. 6 is a bottom view of the denture mold according to the first preferred embodiment of the present invention.

The denture mold preparing step (step S20) includes preparing the denture mold 40. FIG. 5 is a top view of the denture mold 40. FIG. 6 is a bottom view of the denture mold 40. The denture mold 40 is used to manufacture the plate denture 10. The denture mold 40 is indirectly attachable to a cutting apparatus 60 (see FIG. 12) through an adapter 30 (see FIG. 8). Alternatively, the denture mold 40 may be directly attachable to the cutting apparatus 60. The denture mold 40 is a disposable article to be cut by the cutting apparatus 60 in step S30 and step S70 (which will be described below). The denture mold 40 may be included in a plate denture manufacturing kit (which will be described below).

From the viewpoint of increasing moldability and reducing weight, the denture mold 40 is made of, for example, a resin material. The resin material may be thermosetting or thermoplastic. Examples of the resin material include, but not limited to, acrylic resin, polycarbonate resin, polyamide resin, polyester resin, and acrylonitrile butadiene styrene (ABS) resin. Any one of these resin materials may be used solely, or a combination of any two or more of these resin materials may be used. A blend of any two or more of these resin materials may be used, or any two or more of these resin materials may be used to form different portions of the denture mold 40. The denture mold 40 may be made of a ceramic material and/or a metallic material. From the viewpoint of increasing heat resistance, the denture mold 40 is preferably made of acrylic resin, such as polymethyl methacrylate (PMMA) resin. As illustrated in FIG. 6, the denture mold 40 is a combination of a main member 40A made of PMMA resin and a reinforcing member 40B. The main member 40A and the reinforcing member 40B are molded into one piece by an insert molding process.

As illustrated in FIG. 5, the main member 40A includes a bottom wall 45, a first side wall 41, a second side wall 42, a third side wall 43, and a fourth side wall 44. The bottom wall 45 includes a flat surface. The first side wall 41 extends upward from the rear portion of the bottom wall 45. The second side wall 42 extends upward from the front portion of the bottom wall 45. The first side wall 41 and the second side wall 42 face each other. The third side wall 43 extends upward from the left portion of the bottom wall 45. The third side wall 43 connects the left end of the first side wall 41 with the left end of the second side wall 42. The third side wall 43 is curved away from the fourth side wall 44. The fourth side wall 44 extends upward from the right portion of the bottom wall 45. The fourth side wall 44 connects the right end of the first side wall 41 with the right end of the second side wall 42. The fourth side wall 44 is curved away from the third side wall 43. The third side wall 43 and the fourth side wall 44 face each other. The first side wall 41 includes an upper surface 41A. The second side wall 42 includes an upper surface 42A. The third side wall 43 includes an upper surface 43A. The fourth side wall 44 includes an upper surface 44A. The upper surfaces 41A, 42A, 43A, and 44A are flush with each other. The upper surfaces 41A to 44A are thus equal in height from the bottom wall 45. In the present preferred embodiment, the first to fourth side walls 41 to 44 are each an example of a side wall extending upward from the bottom wall 45.

As illustrated in FIG. 5, the main member 40A includes an opening 47 and a forming space 48. The opening 47 is defined at a location facing the bottom wall 45. In other words, the opening 47 is defined in the upper portion of the main member 40A. The forming space 48 is surrounded by the bottom wall 45, the first side wall 41, the second side wall 42, the third side wall 43, and the fourth side wall 44. The forming space 48 is larger than the plate denture 10 in plan view. The depth of the forming space 48 (i.e., the length measured between the bottom wall 45 and the upper surfaces 41A to 44A of the first to fourth side walls 41 to 44) is longer than the maximum thickness of the plate denture 10 (e.g., the maximum length of the artificial teeth 15 in the direction of extension thereof). A denture base material (which will be described below) is poured into the forming space 48 in step S60 (which will be described below). The inner surface of the main member 40A that defines the forming space 48 is preferably made of a resin material similar in type to the denture base material. The bottom wall 45, in particular, is preferably made of a resin material similar in type to the denture base material. The denture mold 40 is thus more reliably bonded to a denture base material cured product 21 (see FIG. 20) in step S60 (which will be described below).

Figure 7:
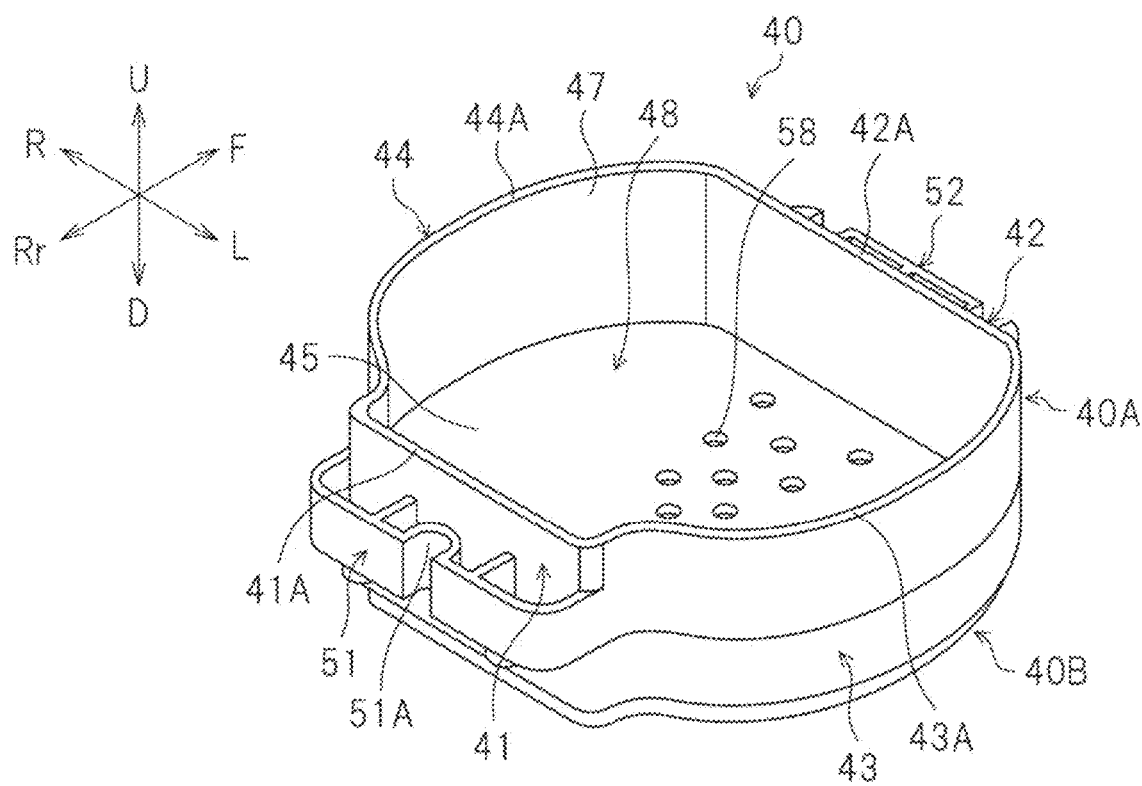
FIG. 7 is a perspective view of the denture mold according to the first preferred embodiment of the present invention.

As illustrated in FIG. 5, the bottom wall 45 includes a cutting target region 55 that is to be cut by the cutting apparatus 60 (see FIG. 12) so as to define the grooves 46A (see FIG. 16) for the artificial teeth 15, and a plurality of vent holes 58 (see also FIG. 7) passing through the bottom wall 45 in an up-down direction and in communication with the forming space 48. The grooves 46A are defined in the cutting target region 55 in step S30 (which will be described below). The artificial teeth 15 are placed in the grooves 46A in step S50 (which will be described below). The cutting target region 55 has an arc shape. The cutting target region 55 is located to surround the vent holes 58. The vent holes 58 are provided in the central region of the bottom wall 45 in plan view. Although the number of vent holes 58 provided is nine in the present preferred embodiment, any other suitable number of vent holes 58 may be provided. Alternatively, the vent holes 58 may be provided outward of the cutting target region 55 in plan view. The vent holes 58 may each have a diameter of between about 2 mm and about 4 mm or may each have, for example, a diameter of about 3 mm. The vent holes 58 may each have any other suitable diameter. The percentage of area of the bottom wall 45 occupied by the vent holes 58 (i.e., the percentage of opening area of the bottom wall 45) is between about 3% and about 8%, or may be, for example, between about 4% and about 5% inclusive.

As illustrated in FIG. 5, the main member 40A includes a first retained portion 51 and a second retained portion 52. The first and second retained portions 51 and 52 are to be retained by the adapter 30. The first and second retained portions 51 and 52 are to be retained by the cutting apparatus 60 through the adapter 30. The first and second retained portions 51 and 52 are each an example of a retained portion. The first retained portion 51 is provided on the rear portion of the first side wall 41. The second retained portion 52 is provided on the front portion of the second side wall 42. The upper surface of the first retained portion 51 and the upper surface of the second retained portion 52 are located within the same plane. The lower surface of the first retained portion 51 and the lower surface of the second retained portion 52 are located within the same plane. In the present preferred embodiment, the first retained portion 51 and the second retained portion 52 respectively have a length L51 and a length L52 different from each other. The length L51 of the first retained portion 51 is longer than the length L52 of the second retained portion 52. Alternatively, the length L51 may be equal to the length L52.

As illustrated in FIG. 5, the first retained portion 51 is provided with a first recess 51A. The first recess 51A is defined in a substantially central region of the first retained portion 51. The first recess 51A is recessed toward the first side wall 41. The first recess 51A passes through the first retained portion 51 in the up-down direction. One of screws 33 (see FIG. 8) is inserted into the first recess 51A in step S30 (which will be described below). The second retained portion 52 is provided with a second recess 52A and a third recess 52B. The second recess 52A is defined leftward of the third recess 52B. The second recess 52A is located leftward of the first recess 51A. The third recess 52B is located rightward of the first recess 51A. The second recess 52A and the third recess 52B are recessed toward the second side wall 42. The second recess 52A and the third recess 52B each pass through the second retained portion 52 in the up-down direction. The other screws 33 are inserted into the second recess 52A and the third recess 52B in step S30 (which will be described below).

As illustrated in FIG. 6, the lower surface of the first retained portion 51 is provided with two protrusions 51X. One of the two protrusions 51X is provided rightward of the first recess 51A. The other one of the two protrusions 51X is provided leftward of the first recess 51A. The protrusions 51X extend downward from the first retained portion 51. The protrusions 51X are each fitted into an associated one of two grooves 32X (see FIG. 9) of the adapter 30 in step S30 (which will be described below). The lower surface of the second retained portion 52 is provided with a protrusion 52X. The protrusion 52X is provided on a substantially intermediate region of the second retained portion 52 between the second recess 52A and the third recess 52B. The protrusion 52X extends downward from the second retained portion 52. The protrusion 52X is fitted into a groove 32Y (see FIG. 9) of the adapter 30 in step S30 (which will be described below).

As illustrated in FIG. 6, the reinforcing member 40B is attached to the lower surface of the main member 40A. The reinforcing member 40B is substantially U-shaped in plan view. The reinforcing member 40B is disposed to extend along the lower surface of the bottom wall 45. The reinforcing member 40B does not define the forming space 48.

The reinforcing member 40B does not overlap with any of the vent holes 58 in bottom view. In the present preferred embodiment, the reinforcing member 40B is made of a material (such as a resin material) similar in type to the material of the main member 40A. Alternatively, the main member 40A and the reinforcing member 40B may be made of different resin materials. The reinforcing member 40B may be optional.

The denture mold cutting step (step S30) includes cutting the cutting target region 55 of the bottom wall 45 of the denture mold 40 using the cutting apparatus 60, thus cutting the grooves 46A, which define the artificial tooth impression 46, in the cutting target region 55. The denture mold cutting step (step S30) includes, for example, a cutting data creating step (sub-step S31), a denture mold attaching step (sub-step S32), a cutting apparatus preparing step (sub-step S33), and a cutting step (sub-step S34). Any other sub-step may be performed at any time during step S30.

Sub-step S31 includes creating cutting data for the artificial tooth impression 46 in accordance with the STL data 16A for the artificial tooth impression 46, which has been prepared in the three-dimensional data preparing step (step S10). The cutting data is "numerical control (NC) data". The cutting data is created by, for example, a computer-aided manufacturing (CAM) device communicably connected to the CAD device.

Figure 8:
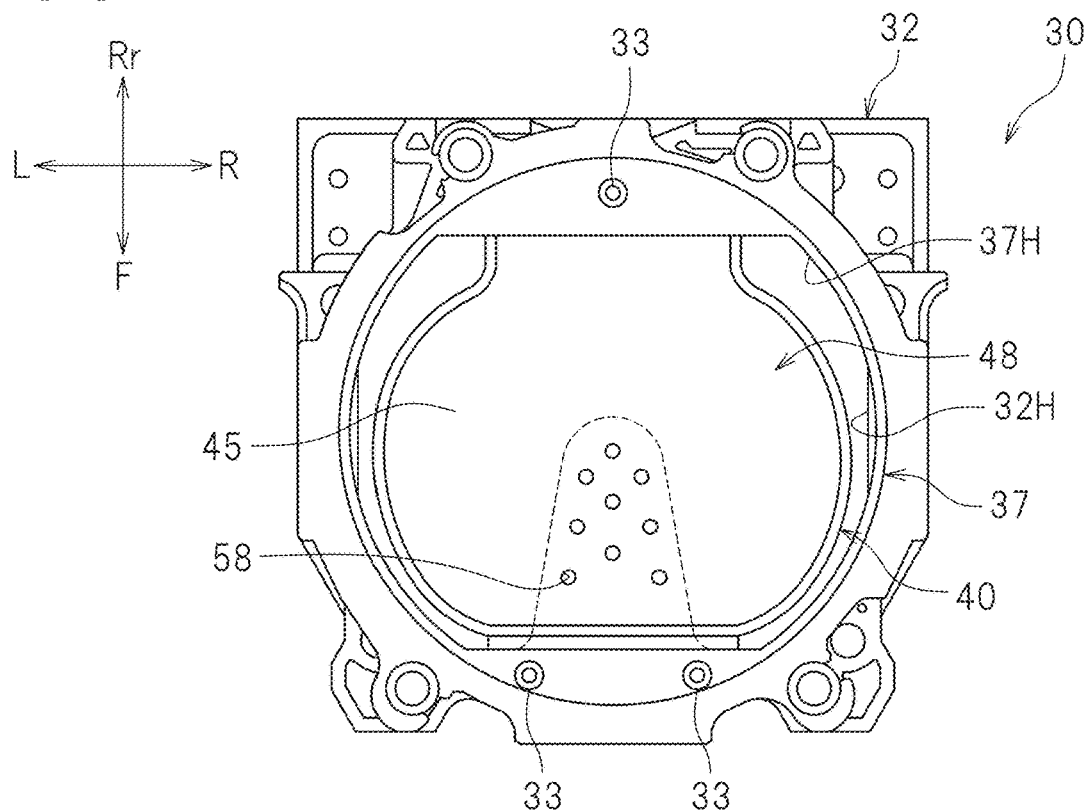
FIG. 8 is a plan view of an adapter according to the first preferred embodiment of the present invention.
Figure 9:
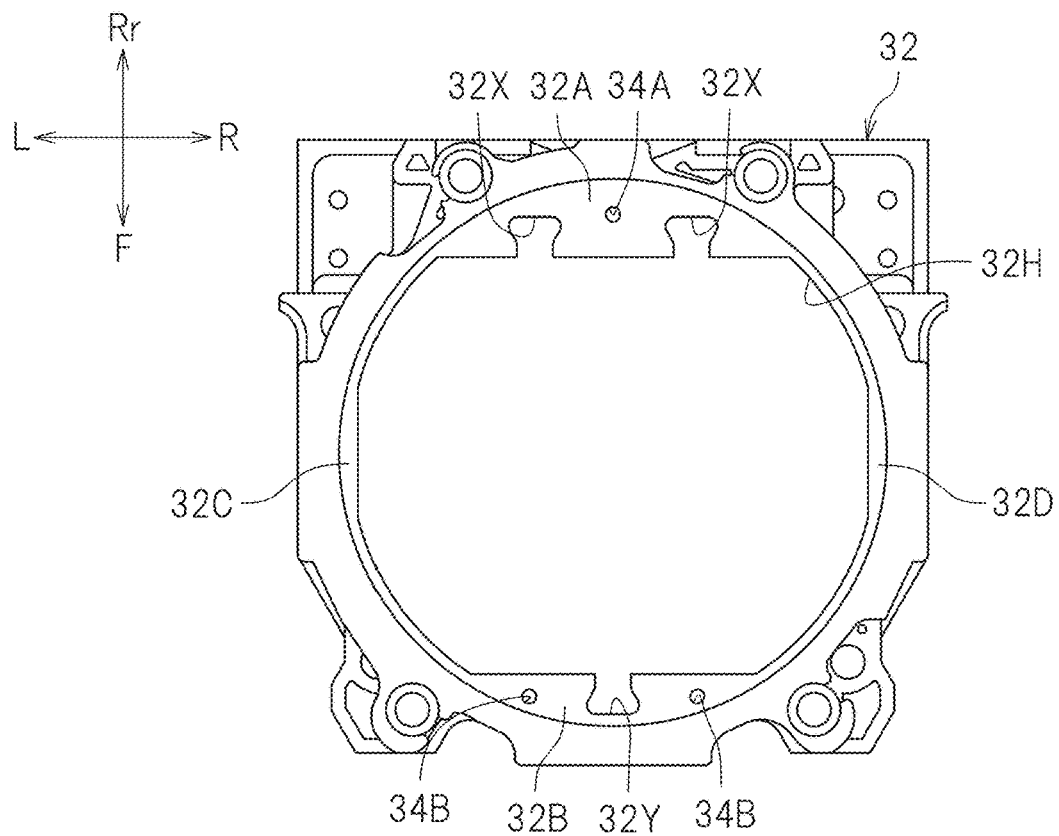
FIG. 9 is a plan view of a body of the adapter according to the first preferred embodiment of the present invention.
Figure 10:
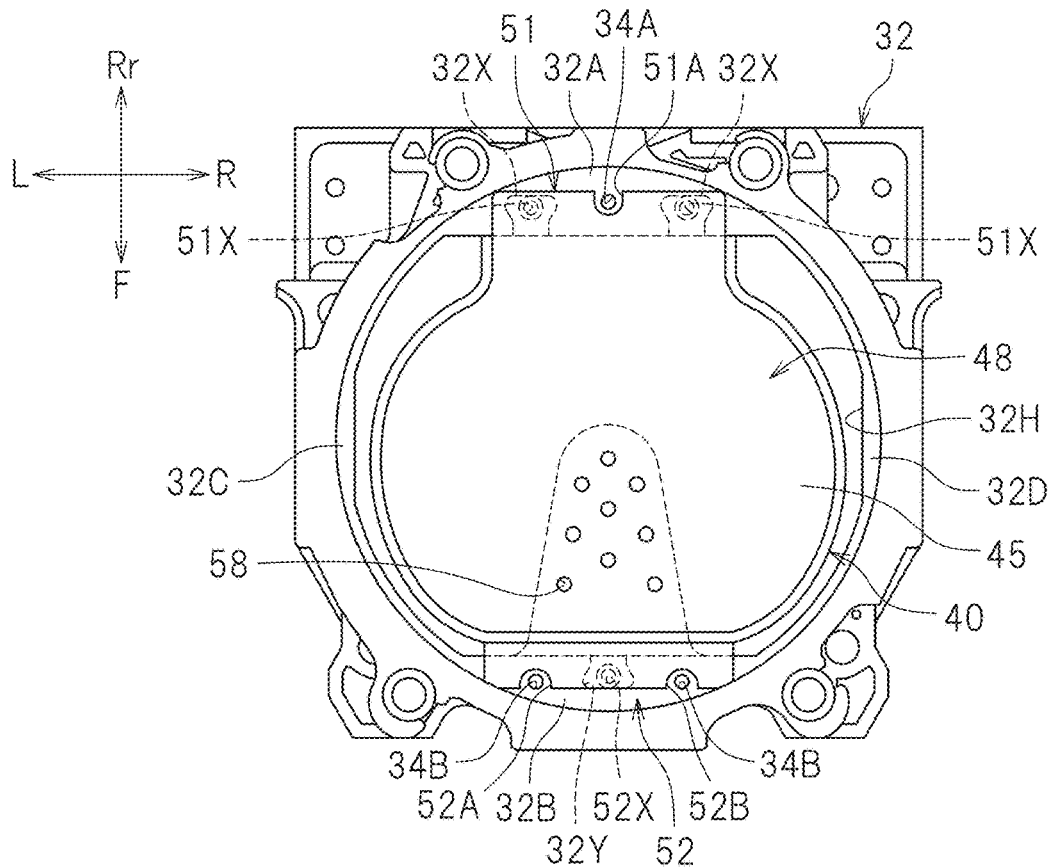
FIG. 10 is a plan view of the body of the adapter according to the first preferred embodiment of the present invention, with the denture mold retained by the body.
Figure 11:
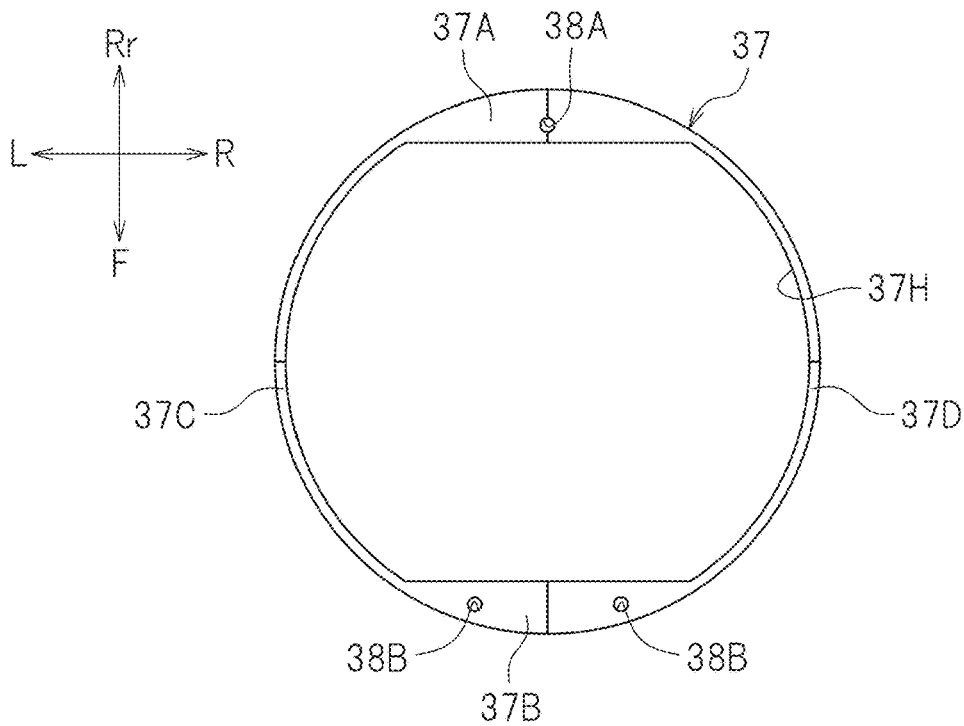
FIG. 11 is a plan view of a retaining plate of the adapter according to the first preferred embodiment of the present invention.

Sub-step S32 includes attaching the denture mold 40 to the adapter 30. FIG. 8 is a plan view of the adapter 30. The adapter 30 is a fixture to attach the denture mold 40 to the cutting apparatus 60. The adapter 30 includes a body 32 and a retaining plate 37. The body 32 is an example of a first structure. The retaining plate 37 is an example of a second structure. The denture mold 40 is clamped between the body 32 and the retaining plate 37. FIGS. 9 and 10 are each a plan view of the body 32. FIG. 10 illustrates the body 32 and the denture mold 40 retained by the body 32. FIG. 11 is a plan view of the retaining plate 37. The first and second retained portions 51 and 52 of the denture mold 40 are retained by the adapter 30. The adapter 30 may be included in the plate denture manufacturing kit (which will be described below).

As illustrated in FIG. 9, the body 32 includes a first portion 32A, a second portion 32B, a third portion 32C, and a fourth portion 32D. The first portion 32A is provided with the two grooves 32X recessed away from the second portion 32B. The two protrusions 51X (see FIG. 6) of the denture mold 40 are each fitted into an associated one of the two grooves 32X. The second portion 32B is provided with the groove 32Y recessed away from the first portion 32A. The protrusion 52X (see FIG. 6) of the denture mold 40 is fitted into the groove 32Y. The third portion 32C connects the left end of the first portion 32A with the left end of the second portion 32B. The fourth portion 32D connects the right end of the first portion 32A with the right end of the second portion 32B. An opening 32H is located inward of the first to fourth portions 32A to 32D. The forming space 48 (see FIG. 5) of the denture mold 40 is disposed in the opening 32H. The first retained portion 51 (see FIG. 5) of the denture mold 40 faces the first portion 32A. The second retained portion 52 (see FIG. 5) of the denture mold 40 faces the second portion 32B.

As illustrated in FIG. 10, the first portion 32A of the body 32 is provided with a threaded hole 34A. With the denture mold 40 retained by the body 32, the threaded hole 34A overlaps with the first recess 51A defined in the first retained portion 51 (see FIG. 5) of the denture mold 40 in plan view. The second portion 32B of the body 32 is provided with left and right threaded holes 34B. With the denture mold 40 retained by the body 32, the left and right threaded holes 34B respectively overlap with the second and third recesses 52A and 52B of the second retained portion 52 (see FIG. 5) of the denture mold 40 in plan view. The denture mold 40 is thus not fastened with the screws 33. More specifically, the first and second retained portions 51 and 52 are not fastened with the screws 33.

As illustrated in FIG. 11, the retaining plate 37 has an annular outer shape. The retaining plate 37 is detachably attached to the body 32. The retaining plate 37 includes a first portion 37A, a second portion 37B, a third portion 37C, and a fourth portion 37D. The first portion 37A of the retaining plate 37 faces the first portion 32A of the body 32. The first portion 37A presses the first retained portion 51 (see FIG. 5) of the denture mold 40 against the body 32. The second portion 37B of the retaining plate 37 faces the second portion 32B of the body 32. The second portion 37B presses the second retained portion (see FIG. 5) of the denture mold 40 against the body 32. The third portion 37C of the retaining plate 37 faces the third portion 32C of the body 32. The fourth portion 37D of the retaining plate 37 faces the fourth portion 32D of the body 32. An opening 37H is located inward of the first to fourth portions 37A to 37D. The forming space 48 (see FIG. 5) of the denture mold 40 is disposed in the opening 37H.

The first portion 37A of the retaining plate 37 is provided with a threaded hole 38A overlapping with the threaded hole 34A of the body 32 in plan view. The second portion 37B of the retaining plate 37 is provided with threaded holes 38B overlapping with the threaded holes 34B of the body 32 in plan view.

As illustrated in FIG. 8, with the denture mold 40 retained by the body 32 and pressed by the retaining plate 37, the screws 33 are inserted through the threaded holes 34A and 34B of the body 32 and the threaded holes 38A and 38B of the retaining plate 37. The body 32 and the retaining plate 37 are thus fastened to each other with the screws 33 at three locations. The first retained portion 51 of the denture mold 40 is clamped between the first portion 32A of the body 32 and the first portion 37A of the retaining plate 37. The second retained portion 52 of the denture mold 40 is clamped between the second portion 32B of the body 32 and the second portion 37B of the retaining plate 37. Because the denture mold 40 is stably retained by the adapter 30, the present preferred embodiment prevents misalignment during cutting or, in particular, misalignment within the XY plane of a clamp 66 (see FIG. 14).

Figure 12:
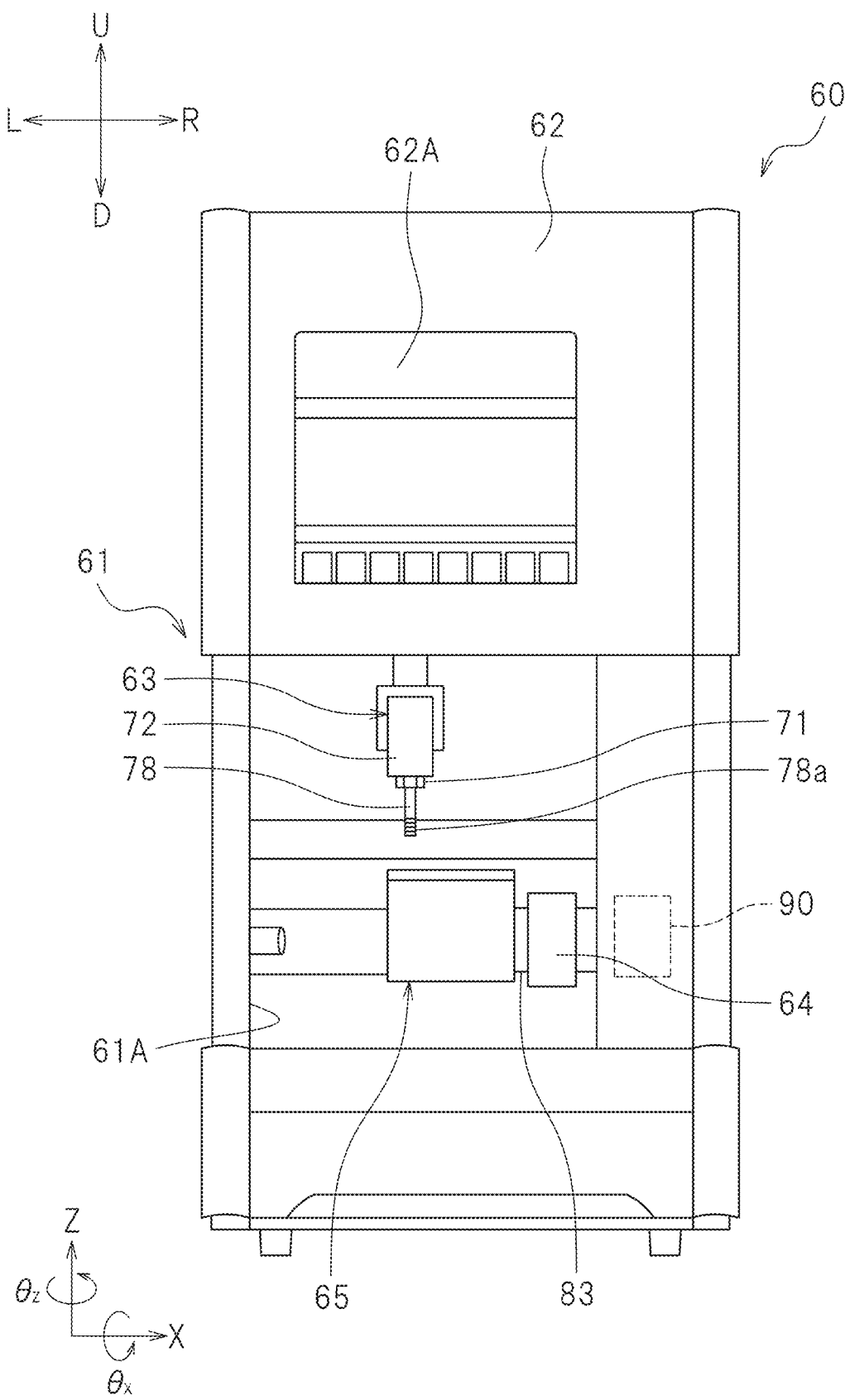
FIG. 12 is a front view of a cutting apparatus according to the first preferred embodiment of the present invention.

Sub-step S33 includes preparing the cutting apparatus 60. FIG. 12 is a front view of the cutting apparatus 60. FIG. 12 illustrates the cutting apparatus 60, with its cover 62 opened. In the following description on the cutting apparatus 60, the terms "leftward" and "rightward" respectively refer to a leftward direction and a rightward direction with respect to an operator (e.g., a dental technician) facing the front of the cutting apparatus 60. The term "forward" refers to a direction away from the rear of the cutting apparatus 60 and toward the operator. The term "rearward" refers to a direction away from the operator and toward the rear of the cutting apparatus 60. Assuming that an X axis, a Y axis, and a Z axis are perpendicular to each other, the cutting apparatus 60 is disposed on a plane defined by the X axis and the Y axis. The X axis extends in a right-left direction. The Y axis extends in a front-rear direction. The Z axis extends in an up-down direction. The reference sign $\theta_X$ represents a rotational direction around the X axis. The reference sign $\theta_Y$ represents a rotational direction around the Y axis. The reference sign $\theta_Z$ represents a rotational direction around the Z axis. These directions are defined merely for the sake of convenience of description and do not limit in any way how the cutting apparatus 60 may be installed.

As illustrated in FIG. 12, the cutting apparatus 60 includes a case body 61, the cover 62, a spindle 63, a tool magazine 64 (see also FIG. 13), a rotary support 65 (see also FIG. 14), the clamp 66 (see FIG. 14), and a controller 90. The case body 61 has a box shape. The case body 61 includes a machining space 61A defined therein. The front portion of the case body 61 is provided with an opening. The cover 62 is movable along the front end of the case body 61 in the up-down direction. The machining space 61A is openable and closable by the cover 62. Upward movement of the cover 62 brings the machining space 61A of the case body 61 into communication with an external space. The cover 62 is provided with a window 62A. This enables the operator to visually check the inside of the machining space 61A through the window 62A, for example, during cutting.

The spindle 63 grips a machining tool 78 during cutting. The spindle 63 cuts the cutting target region 55 (see FIG. 5) of the bottom wall 45 of the denture mold 40 by rotating the machining tool 78. The spindle 63 includes a tool gripper 71 and a rotator 72 provided on the upper end of the tool gripper 71. The tool gripper 71 grips the upper end of the machining tool 78. The rotator 72 rotates the machining tool 78 gripped by the tool gripper 71. The rotator 72 extends in the up-down direction. The rotator 72 is connected with a first drive motor 72a (see FIG. 15). The first drive motor 72a is connected to the controller 90 and thus controlled by the controller 90. Driving the first drive motor 72a enables the rotator 72 to rotate in the rotational direction $\theta_Z$ around the Z axis. The rotation of the rotator 72 causes the machining tool 78 gripped by the tool gripper 71 to rotate in the rotational direction $\theta_Z$ around the Z axis. A first driver (not illustrated) is provided for the rotator 72. The rotator 72 is movable in the right-left direction and the up-down direction by the first driver.

Figure 13:
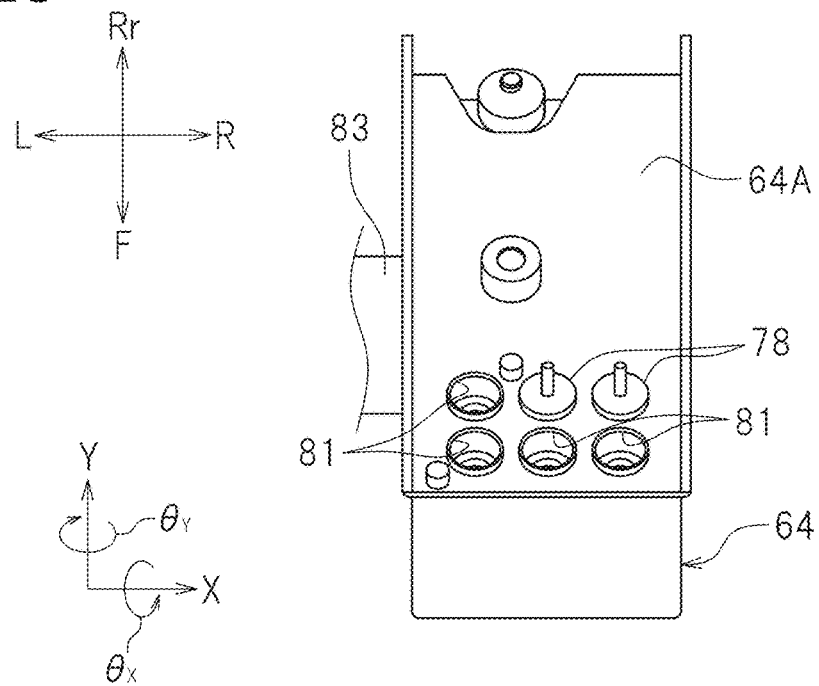
FIG. 13 is a perspective view of a tool magazine according to the first preferred embodiment of the present invention.

FIG. 13 is a perspective view of the tool magazine 64. As illustrated in FIG. 13, the tool magazine 64 has a box shape. The tool magazine 64 includes an upper surface 64A provided with a plurality of through holes 81 to hold the machining tools 78. Each machining tool 78 is inserted into or through an associated one of the through holes 81 such that the upper portion of each machining tool 78 is exposed. Replacement of the machining tool 78 includes returning the machining tool 78, gripped by the tool gripper 71, to an unoccupied one of the through holes 81, moving the tool gripper 71 and the rotator 72 to a position over the machining tool 78 to be used next, and causing the tool gripper 71 to grip the upper end of the machining tool 78 to be used next.

Figure 14:
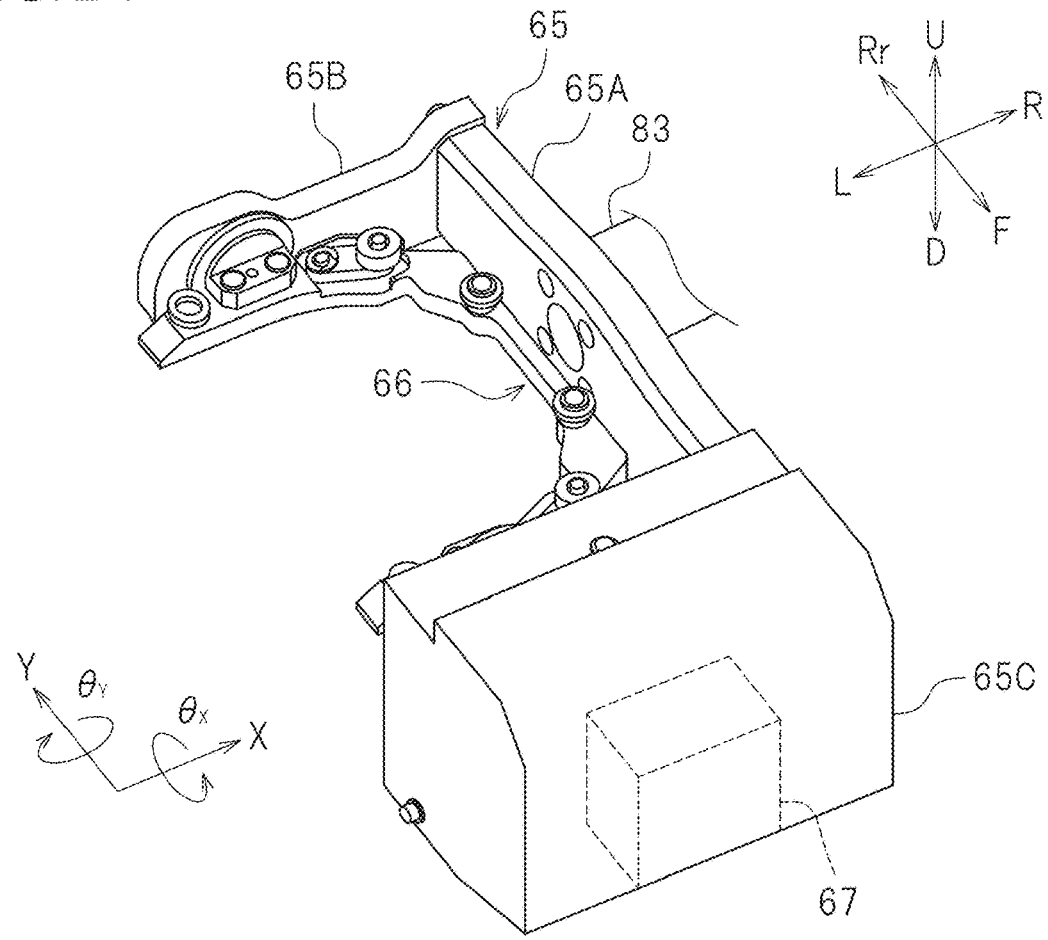
FIG. 14 is a perspective view of a rotary support and a clamp according to the first preferred embodiment of the present invention.

FIG. 14 is a perspective view of the rotary support 65 and the clamp 66. As illustrated in FIG. 13, the tool magazine 64 is provided with a first rotary shaft 83. The first rotary shaft 83 supports the rotary support 65 such that the rotary support 65 is rotatable. The first rotary shaft 83 extends in the right-left direction. The first rotary shaft 83 is coupled to the rotary support 65. The tool magazine 64 is provided with a second driver (not illustrated). The first rotary shaft 83 is rotatable in the rotational direction $\theta_X$ around the X axis by the second driver. The rotation of the first rotary shaft 83 in the rotational direction $\theta_X$ around the X axis causes the rotary support 65 to rotate in the rotational direction $\theta_X$ around the X axis. The rotary support 65 supports the clamp 66 such that the clamp 66 is rotatable. The rotary support 65 is substantially U-shaped in plan view. The rotary support 65 is coupled to the first rotary shaft 83. The rotary support 65 includes a first portion 65A extending in the front-rear direction, a second portion 65B extending leftward from the rear end of the first portion 65A, and a third portion 65C extending leftward from the front end of the first portion 65A. The clamp 66 is rotatably supported by the second portion 65B and the third portion 65C. The third portion 65C is provided with a second drive motor 67 to rotate the clamp 66 in the rotational direction $\theta_Y$ around the Y axis.

The clamp 66 retains the denture mold 40 during cutting. In the present preferred embodiment, the clamp 66 retains the adapter 30 having the denture mold 40 attached thereto. The clamp 66 thus indirectly retains the denture mold 40 through the adapter 30. In FIG. 14, the adapter 30 is not illustrated. The denture mold 40 retained by the clamp 66 is cut by the cutting apparatus 60.

Figure 15:
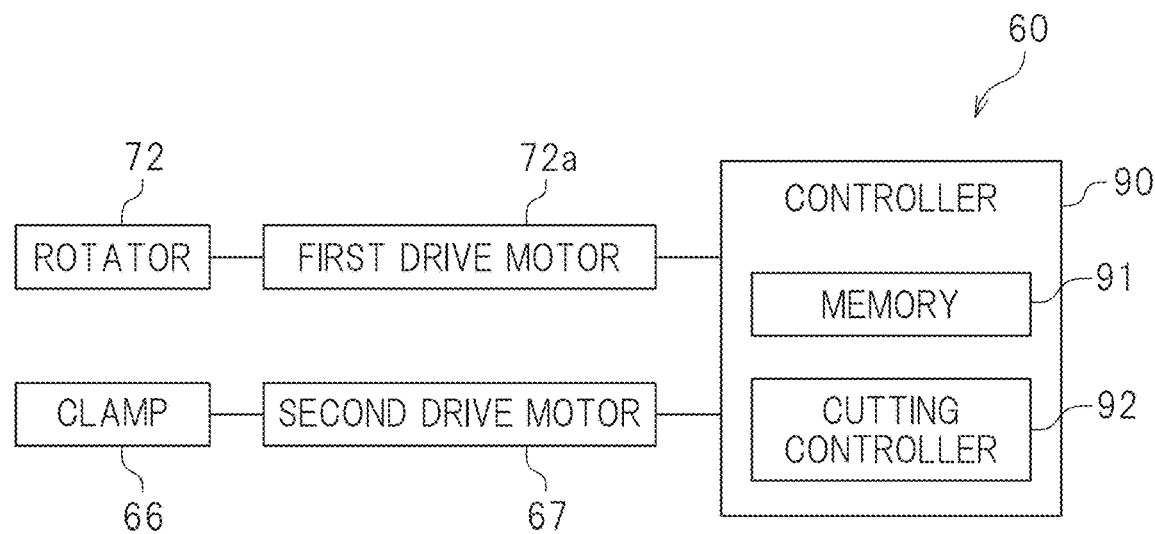
FIG. 15 is a block diagram of a control system for the cutting apparatus according to the first preferred embodiment of the present invention.

FIG. 15 is a block diagram of the controller 90. The controller 90 exercises control for cutting. As illustrated in FIG. 12, the controller 90 is provided inside the case body 61. Alternatively, a portion of the controller 90 may be, for example, a general-purpose personal computer disposed outside the case body 61 and connected to the cutting apparatus 60 such that wired or wireless communication is enabled therebetween. The controller 90 is not limited to any particular hardware configuration. The controller 90 includes, for example, a central processing unit (CPU), a read-only memory (ROM), a random-access memory (RAM), and a storage, such as a memory. The CPU executes commands included in a control program. The ROM stores the program to be executed by the CPU. The RAM is used as a working area where the program is to be expanded. The storage stores the program and various types of data.

The controller 90 is communicably connected to the first drive motor 72a and the second drive motor 67. The controller 90 is thus able to control the first drive motor 72a and the second drive motor 67. The controller 90 controls driving of the first drive motor 72a so as to control rotation of the rotator 72 of the spindle 63. The controller 90 controls the rotator 72 such that the rotator 72 moves in the right-left direction and the up-down direction. The controller 90 controls driving of the second drive motor 67 so as to control rotation of the clamp 66 in the rotational direction $\theta_Y$ around the Y axis. The controller 90 controls the first rotary shaft 83 such that the first rotary shaft 83 rotates in the rotational direction $\theta_X$ around the X axis.

The controller 90 includes a memory 91 and a cutting controller 92. The functions of the controller 90 may be implemented by software or hardware. The memory 91 is communicably connected to the CAM device. The cutting data created by the CAM device is stored in the memory 91. The cutting data typically includes a plurality of machining steps defining, using coordinate values, operations of the spindle 63 and operations of the clamp 66 retaining the denture mold 40.

Figure 16:
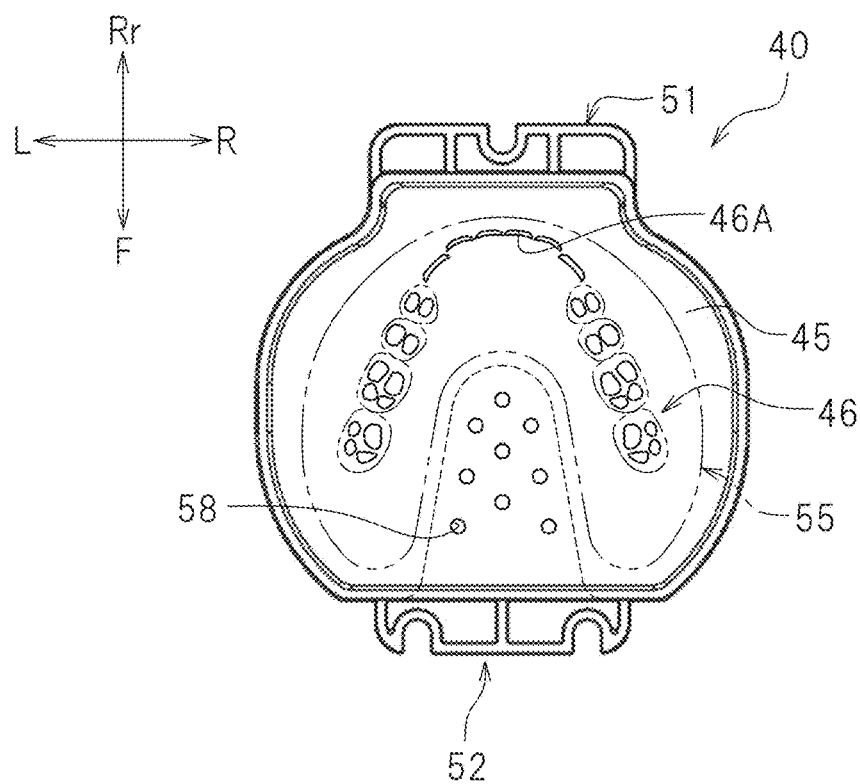
FIG. 16 is a plan view of the denture mold according to the first preferred embodiment of the present invention, illustrating grooves cut in a cutting target region of the denture mold.

Sub-step S34 includes cutting the denture mold 40 using the cutting apparatus 60. In accordance with the cutting data stored in the memory 91, the cutting controller 92 controls the operations of the spindle 63 and the clamp 66 so as to control cutting operations. The cutting controller 92 brings an extremity 78a (see FIG. 12) of the machining tool 78 being rotated by the spindle 63 into contact with the cutting target region 55 (see FIG. 5) of the bottom wall 45 of the denture mold 40, thus cutting the grooves 46A (see FIG. 16), which define the artificial tooth impression 46, in the cutting target region 55. FIG. 16 is a plan view of the denture mold 40, illustrating the grooves 46A cut in the bottom wall 45 of the denture mold 40. The artificial tooth impression 46 includes the grooves 46A into which the artificial teeth 15 are to be fitted. In the present preferred embodiment, the number of grooves 46A is 14 in total, for example. The grooves 46A each have a depth of, for example, between about 2 mm and about 5 mm.

The denture mold placing step (step S40) includes placing, on a holder 95, the denture mold 40 in which the grooves 46A have been cut. The denture mold 40 is placed on the holder 95 so as to close the vent holes 58 defined in the bottom wall 45 of the denture mold 40. The denture mold placing step (step S40) may be performed while the adapter 30 remains attached to the denture mold 40, or may be performed after the adapter 30 is detached from the denture mold 40. The holder 95 may be included in the plate denture manufacturing kit (which will be described below).

Figure 17:
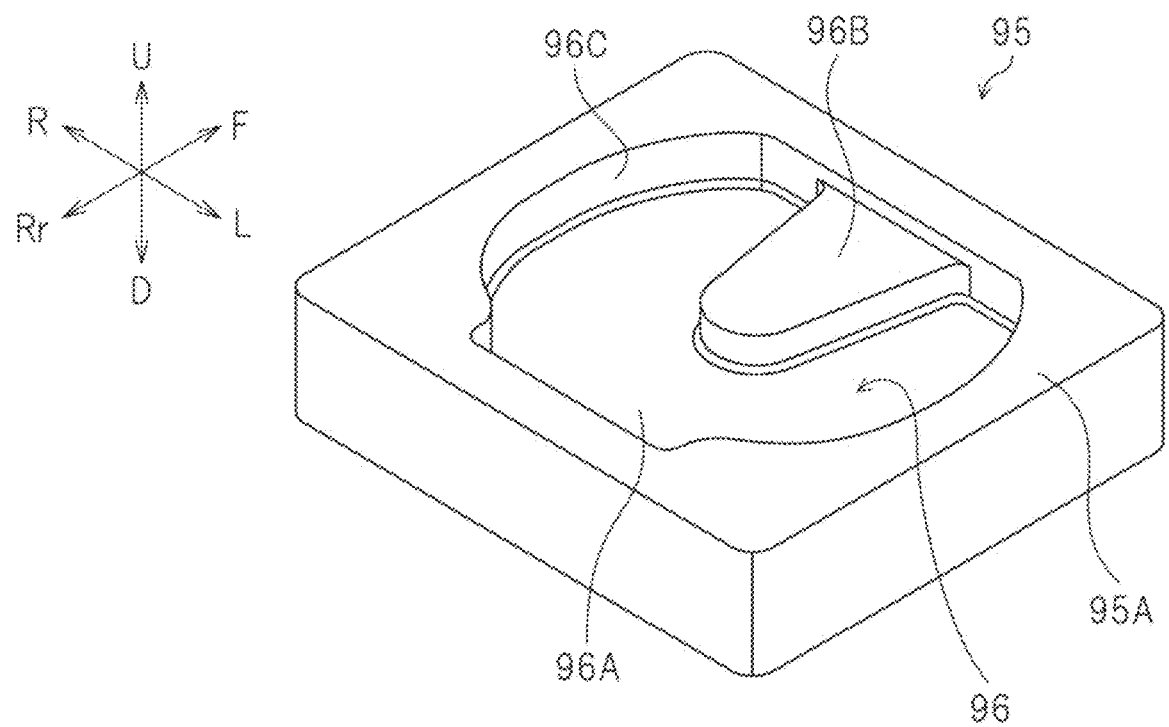
FIG. 17 is a perspective view of a holder according to the first preferred embodiment of the present invention.
Figure 18:
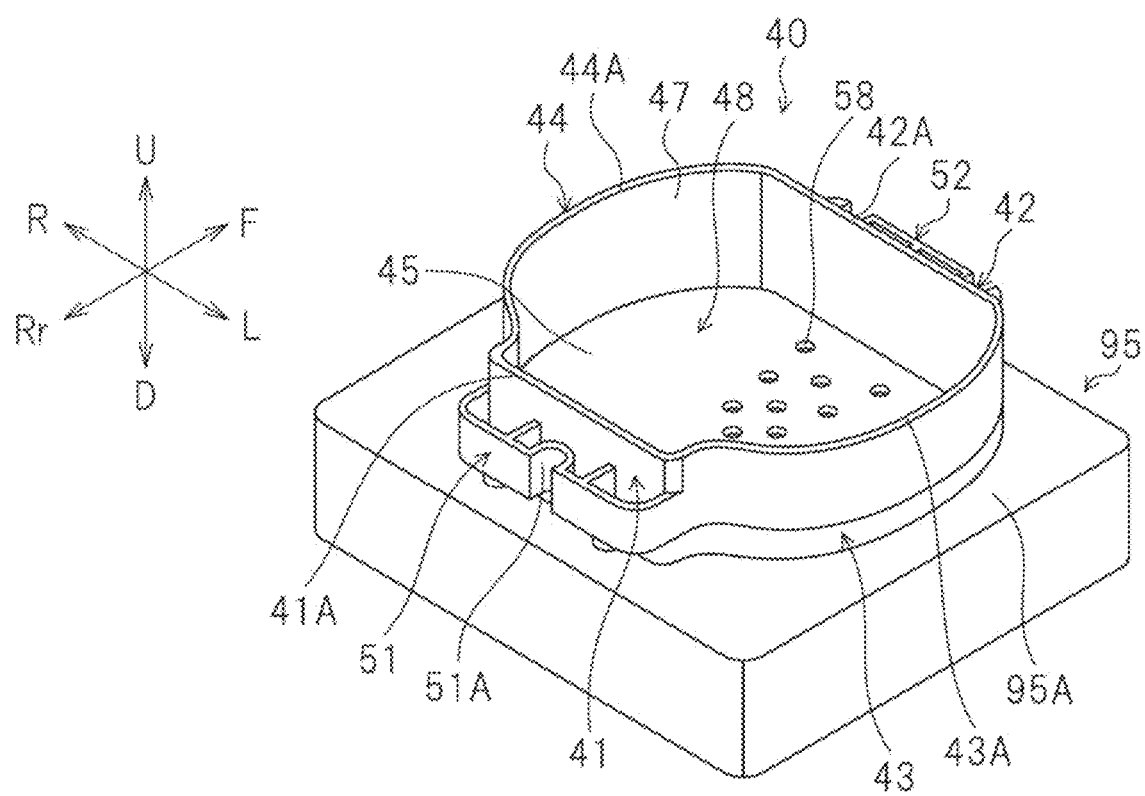
FIG. 18 is a perspective view of the holder according to the first preferred embodiment of the present invention, with the denture mold placed on the holder.

FIG. 17 is a perspective view of the holder 95. As illustrated in FIG. 17, the holder 95 has a substantially cuboid shape. The holder 95 includes an upper surface 95A provided with a recess 96 recessed downward. As illustrated in FIG. 18, the denture mold 40 is fitted into the recess 96. The recess 96 conforms to the outer shape of the denture mold 40. The bottom of the denture mold 40 is fitted into the recess 96. As illustrated in FIG. 17, the recess 96 includes a first portion 96A that comes into contact with the reinforcing member 40B of the denture mold 40, a second portion 96B that comes into contact with a portion of the bottom wall 45 of the denture mold 40 (or more specifically, the main member 40A) where the vent holes 58 are defined, and a third portion 96C that comes into contact with the lower ends of the first to fourth side walls 41 to 44 of the denture mold 40. The second portion 96B is located above the first portion 96A. The recess 96 (or more specifically, the third portion 96C) has a depth of, for example, between about 5 mm and about 20 mm. The holder 95 is permeable to bubbles (or gas) produced during polymerization of the denture base material (which will be described below). The holder 95 is higher in gas permeability than the denture mold 40. The holder 95 has a gas permeability (e.g., an oxygen permeability) of, for example, between about 10000 ml/m² and about 100000 ml/m². The denture mold 40 has a gas permeability (e.g., an oxygen permeability) of, for example, between about 10 ml/m² and about 100 ml/m². The holder 95 is made of, for example, silicone. In the example illustrated in FIG. 18, the grooves 46A defined in the bottom wall 45 are not illustrated. The gas permeabilities (e.g., gas transmission rates) of the denture mold 40 and the holder 95 are measured in accordance with Japanese Industrial Standards (JIS) K 7126, for example.

The artificial tooth placing step (step S50) includes removing, from the cutting apparatus 60, the denture mold 40 in which the grooves 46A have been cut, and placing the artificial teeth 15 on the denture mold 40. The artificial tooth placing step (step S50) may be performed while the adapter 30 remains attached to the denture mold 40, or may be performed after the adapter 30 is detached from the denture mold 40. The artificial teeth 15 may each be any artificial tooth that has conventionally been used for this type of usage.

Figure 19:
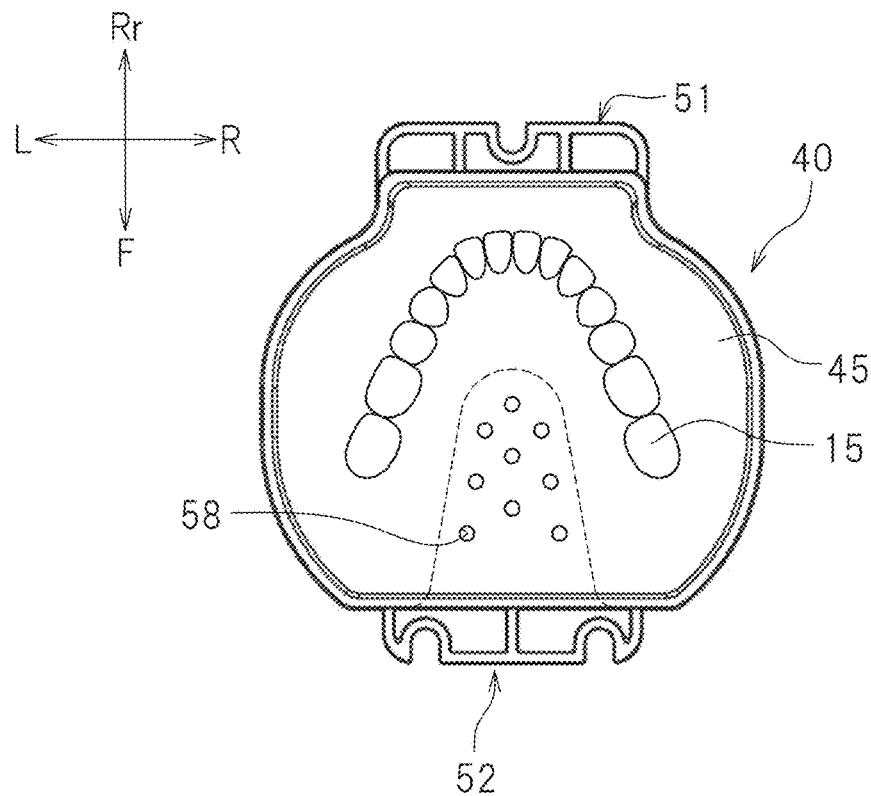
FIG. 19 is a plan view of the denture mold according to the first preferred embodiment of the present invention, illustrating artificial teeth placed in the grooves.

FIG. 19 is a plan view of the denture mold 40, illustrating the artificial teeth 15 placed in the grooves 46A (see FIG. 16) of the denture mold 40. The artificial teeth 15 are placed in the grooves 46A that have been cut in the bottom wall 45 of the denture mold 40 in sub-step S34. Specifically, the artificial teeth 15 are each placed in a corresponding one of the grooves 46A defined in the denture mold 40. Each artificial tooth 15 is thus fitted into the corresponding groove 46A such that each artificial tooth 15 is located in a predetermined position and orientation. Cutting the grooves 46A using the cutting apparatus 60 reduces the risk of errors made by the dental technician, such as placing the artificial teeth 15 in wrong locations or orientations. In the present preferred embodiment, the artificial teeth 15 are placed in the grooves 46A, with the roots of the artificial teeth 15 facing upward. In other words, the artificial teeth 15 are placed in the grooves 46A, with the crowns of the artificial teeth 15 (which come into contact with the lower teeth) facing downward. In the process of fitting the artificial teeth 15 into the grooves 46A, a dental adhesive or other bonding agent may be used optionally.

The denture base material curing step (step S60) includes pouring and curing the denture base material so as to integrate the denture mold 40, the artificial teeth 15, and the denture base material cured product 21 with each other. The denture base material curing step (step S60) may be performed while the adapter 30 remains attached to the denture mold 40, or may be performed after the adapter 30 is detached from the denture mold 40. The denture base material curing step (step S60) includes, for example, a denture base material preparing step (sub-step S61), a denture base material pouring step (sub-step S62), and a one-piece product fabricating step (sub-step S63). In the present preferred embodiment, sub-steps S62 and S63 are each performed once so as to integrate the denture mold 40, the artificial teeth 15, and the denture base material cured product 21 with each other. Any other sub-step may be performed at any time during step S60.

Sub-step S61 includes preparing the denture base material. Any known material that has conventionally been used to form a denture base is usable as the denture base material. Examples of the denture base material include a dental resin material, such as denture base resin (which may hereinafter be referred to as a "denture base resin composition"), dental wax, a dental ceramic material, and gypsum. The denture base material may be a dental curable composition. The denture base resin may contain a polymerizable compound. Examples of the denture base resin include autopolymer resin that starts polymerization at a temperature of lower than about 65° C., heat-curing resin that starts polymerization by being heated at a temperature of about 65° C. or higher (e.g., 80° C. or higher), and photo-polymerized resin that starts polymerization when exposed to light. Heat-curing resin is preferably usable as the denture base material because heat-curing resin is high in mechanical strength, relatively inexpensive, and easily available.

The denture base resin preferably contains resin similar in type to the material of the denture mold 40. When a portion of the denture mold 40 that defines the forming space 48, for example, is made of acrylic resin (such as PMMA), acrylic resin is preferably used as the denture base resin. Examples of the denture base resin usable include polycarbonate resin, polyamide resin, and polyester resin. As specified in Japanese Industrial Standards (JIS) T6501:2012, the acrylic resin is, for example, a substance (1) that is powder whose main component is at least one of a homopolymer of methacrylate ester and a copolymer containing methacrylate ester, a substance (2) that is a liquid whose main component is a methacrylate ester monomer, or a mixture of the substance (1) and the substance (2). As used herein, the term "main component" refers to a component higher in mass percentage than other components. The acrylic resin may be, for example, a combination of powder whose main component is a copolymer of methyl methacrylate (MMA) and 2-ethylhexyl acrylate and a liquid whose main component is methyl methacrylate (MMA). The acrylic resin may be, for example, a combination of powder whose main component is polymethyl methacrylate (PMMA) resin and a liquid whose main component is methyl methacrylate (MMA). The acrylic resin may contain component(s) other than those above. Examples of the component(s) include additives, such as a reaction initiator, a coloring agent, a stabilizer, a plasticizer, a lubricant, a surfactant, and an ultraviolet light absorber.

The use of the mixture of the substances (1) and (2) as the acrylic resin first includes mixing the powdery substance (1) and the liquid substance (2) at a predetermined ratio so as to prepare a fluid composition. The composition may contain bubbles produced by a reaction between the powdery substance (1) and the liquid substance (2). Thus, the use of the mixture of the substances (1) and (2) preferably includes removing the bubbles from the composition (or defoaming the composition). The composition is defoamed by, for example, transmitting vibrations to the composition from a vibrator, applying ultrasound to the composition from an ultrasound applicator, or applying pressure to the composition from a pressure device.

Sub-step S62 includes pouring the denture base material (which has been prepared in sub-step S61) into the forming space 48, with the artificial teeth 15 placed in the grooves 46A defined in the denture mold 40. In the present preferred embodiment, the denture base material is poured into the forming space 48 through the opening 47 of the denture mold 40 such that the forming space 48 is filled with the denture base material. The bottom wall 45 of the denture mold 40 is provided with the vent holes 58, but the denture mold 40 is placed on the holder 95 such that the vent holes 58 are closed with the holder 95. This prevents the denture base material, which has been poured into the forming space 48, from flowing out of the denture mold 40 through the vent holes 58. The amount of the denture base material to be poured is set such that the liquid level of the denture base material will be located below the upper surfaces 41A to 44A of the first to fourth side walls 41 to 44. In the present preferred embodiment, the amount of the denture base material to be poured is set such that a cured product larger than the denture base 20 of the plate denture 10 to be manufactured will be formed. In other words, the amount of the denture base material to be poured is set such that the liquid level of the denture base material will be located slightly below the upper surfaces 41A to 44A of the first to fourth side walls 41 to 44. The amount of the denture base material to be poured is set such that all of the artificial teeth 15 placed within the forming space 48 will be completely buried in the denture base material.

Figure 20:
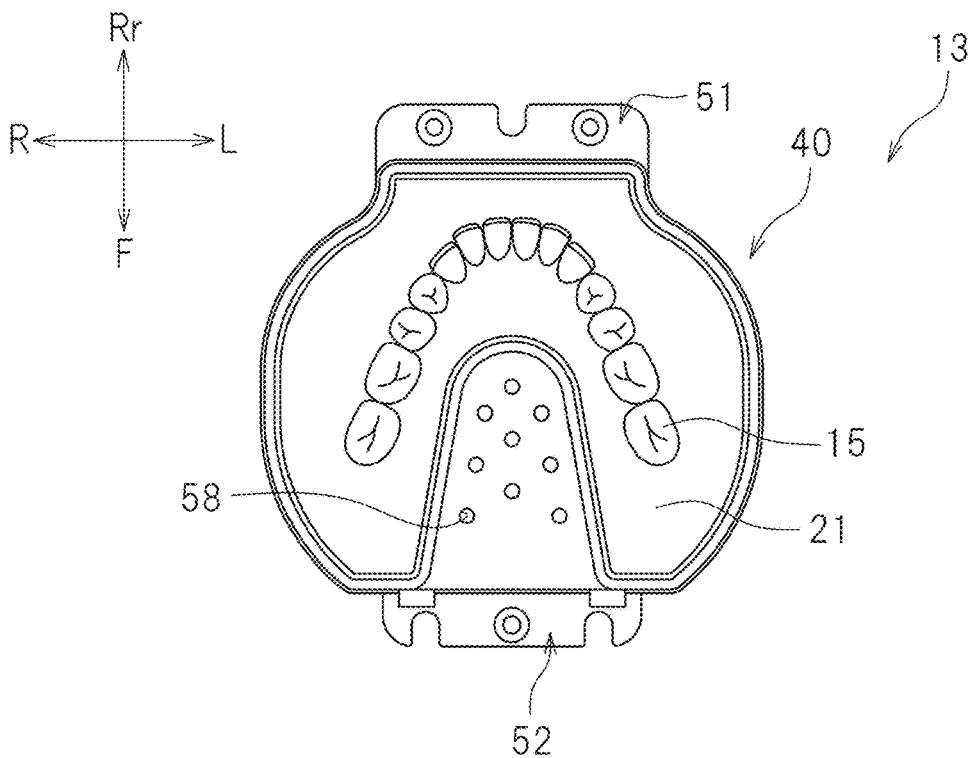
FIG. 20 is a plan view of a one-piece product according to the first preferred embodiment of the present invention.

Sub-step S63 includes curing the denture base material so as to fabricate the one-piece product 13 (see FIG. 20). When the denture base material is heat-curing resin, sub-step S63 includes curing the denture base material by heating the denture base material. The one-piece product 13 includes the denture mold 40, the artificial teeth 15, and the denture base material cured product 21 that are integral with each other. The one-piece product 13 is fabricated by, for example, polymerizing the denture base material (or more specifically, a polymerizable compound contained in the denture base material). The denture base material is polymerized, for example, in a manner described below.

First, a pressure polymerizer (e.g., a pressure pot) is prepared. The denture mold 40 into which the denture base material has been poured in sub-step S62 is subsequently left at rest in the polymerizer. Water is then poured between the polymerizer and the denture mold 40. The amount of water to be poured is adjusted such that the water will not penetrate into the forming space 48 of the denture mold 40. The lid of the polymerizer is then closed such that an enclosed space is defined in the polymerizer.

The inside of the polymerizer is adjusted to predetermined conditions such that the denture base material produces a polymerization reaction. When the denture base material is, for example, denture base resin, the inside of the polymerizer may be pressurized at a pressure of between about 0.01 MPa and about 0.5 MPa, or may be pressurized at, for example, a pressure of between about 0.1 MPa and about 0.3 MPa inclusive. In one example, the inside of the polymerizer may be pressurized at a pressure of about 0.2 MPa. When the denture base material is, for example, autopolymer resin, the water inside the polymerizer may be heated to a temperature higher than room temperature, or may be heated to, for example, a temperature of between about 30° C. and about 60° C. In one example, the water inside the polymerizer may be heated to about 50° C. When the denture base material is, for example, heat-curing resin, the water inside the polymerizer may be heated to a temperature of between about 50° C. and about 70° C. during preliminary polymerization, or may be heated to, for example, a temperature of between about 55° C. and about 65° C. during preliminary polymerization. The water inside the polymerizer may be heated to a temperature of between about 70° C. and about 100° C. during full-scale polymerization, or may be heated to, for example, a temperature of between about 75° C. and about 85° C. during full-scale polymerization. The polymerizer is maintained in these conditions for a predetermined period of time. The polymerizer may be maintained in these conditions for about 20 minutes or more during preliminary polymerization, or may be maintained in these conditions for, for example, about 30 minutes to about 90 minutes during preliminary polymerization. The polymerizer may be maintained in these conditions for about 30 minutes or more during full-scale polymerization, or may be maintained in these conditions for, for example, about 30 minutes to about 40 minutes during full-scale polymerization. In one example, the polymerizer may be maintained in these conditions for 40 minutes during full-scale polymerization. The denture base material is thus polymerized so as to increase at least one of bending strength and hardness. The denture base material cured product 21 is firmly bonded to the artificial teeth 15. The denture base material cured product 21 is firmly bonded to the bottom wall 45 and the first to fourth side walls 41 to 44 of the denture mold 40. As a result, the one-piece product 13 is fabricated. A polymerization reaction of the denture base material produces bubbles (or gas). Heat-curing resin, in particular, produces more bubbles than autopolymer resin. The number of bubbles produced in the central region of the denture mold 40 tends to be larger than the number of bubbles produced in the other regions of the denture mold 40. Because the opening 47 of the denture mold 40 is not closed, bubbles produced near the upper surface of the denture mold 40 are discharged out of the denture mold 40 through the opening 47. The bottom wall 45 of the denture mold 40 is provided with the vent holes 58. The holder 95 is provided to close the vent holes 58. Bubbles produced in the denture mold 40 are thus discharged out of the denture mold 40 through the vent holes 58 and the holder 95. Accordingly, the present preferred embodiment limits or prevents formation of voids caused by the bubbles trapped in the cured product 21. Discharging the bubbles brings the denture mold 40 into more intimate contact with the denture base material so as to limit or prevent shrinkage of the denture base material. Consequently, the present preferred embodiment reduces or prevents occurrence of cracks or bubbles in the cured product 21.

FIG. 20 illustrates an example of the one-piece product 13. The denture mold 40, the artificial teeth 15, and the cured product 21 included in the one-piece product 13 are integral with each other to such an extent that the denture mold 40, the artificial teeth 15, and the cured product 21 will not be separated from the one-piece product 13 during, for example, cutting. The denture base material cured product 21 is machined into the denture base 20 in step S70 (which will be described below). The denture base material cured product 21 and the denture mold 40 may be bonded to each other with a bonding force of about 10 N or more, preferably about 30 N or more, or more preferably about 50 N or more, for example. As used herein, the term "bonding force" refers to a bonding force compliant with JIS T6506:2005.

The one-piece product machining step (step S70) includes machining the one-piece product 13 so as to provide the plate denture 10. The machining process performed in step S70 may include at least one of a cutting process, a polishing process, a grinding process, and a cutting-off process. The one-piece product machining step (step S70) includes, for example, a cutting data creating step (sub-step S71), a denture mold attaching step (sub-step S72), a cutting apparatus preparing step (sub-step S73), a one-piece product cutting step (sub-step S74), and a plate denture fabricating step (sub-step S75). Any other sub-step may be performed at any time during step S70. In an alternative preferred embodiment, sub-steps S71 to S74 may be optional. The dental technician may manually perform all the processes included in step S70.

Sub-step S71 includes creating cutting data for the plate denture 10 in accordance with the STL data 10A for the plate denture 10, which has been prepared in the three-dimensional data preparing step (step S10). The cutting data for the plate denture 10 is data on a program indicating what procedure is to be followed by the cutting apparatus 60 in cutting the one-piece product 13 into the plate denture 10. The cutting data created is stored in the memory 91. Sub-step S72 includes attaching the denture mold 40 to the adapter 30. The denture mold 40 may be attached to the adapter 30 in a manner similar to that in which the denture mold 40 is attached to the adapter 30 in sub-step S32.

Sub-step S73 includes preparing the cutting apparatus 60. The cutting apparatus 60 may be the same as or different from the apparatus prepared in sub-step S33. Sub-step S74 includes cutting the one-piece product 13 using the cutting apparatus 60. The cutting controller 92 brings the extremity 78a (see FIG. 12) of the machining tool 78 being rotated by the spindle 63 into contact with the cured product 21 of the one-piece product 13 so as to cut away unnecessary portion(s) of the cured product 21. The cutting controller 92 may bring the extremity 78a of the machining tool 78 into contact with the denture mold 40 of the one-piece product 13 so as to cut away portion(s) of the denture mold 40 (e.g., a portion or an entirety of the bottom wall 45 and/or a portion or an entirety of each of the first to fourth side walls 41 to 44). The first and second retained portions 51 and 52 of the denture mold 40 are at least partially not cut away and are thus retained by the adapter 30 after cutting.

Figure 21:
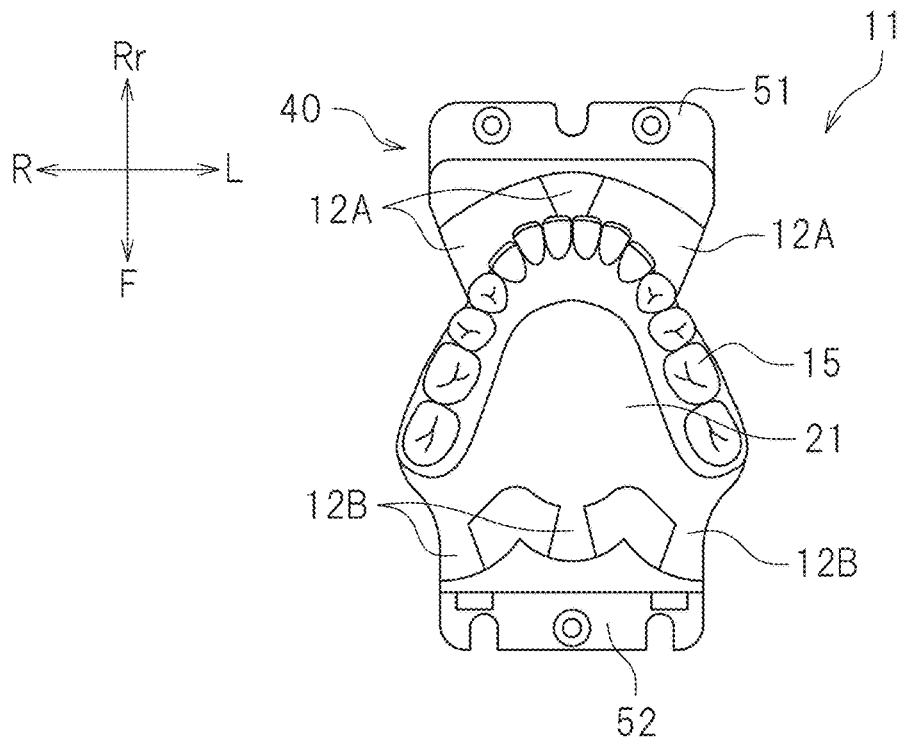
FIG. 21 is a plan view of a cut product according to the first preferred embodiment of the present invention.

FIG. 21 illustrates an example of a cut product 11 provided by cutting the one-piece product 13 using the cutting apparatus 60. The cut product 11 includes the first and second retained portions 51 and 52 of the denture mold 40, the cured product 21 that has been cut to provide the denture base 20, the artificial teeth 15 bonded to the cured product 21, first connectors 12A connecting the first retained portion 51 to the cured product 21, and second connectors 12B connecting the second retained portion 52 to the cured product 21.

Sub-step S75 includes fabricating the plate denture 10 from the cut product 11. Sub-step S75 includes, for example, removing the first and second retained portions 51 and 52 of the denture mold 40 from the cut product 11. In one example, the dental technician cuts away the first and second retained portions 51 and 52 from the cut product 11 using a tool, such as a cutter having an edge. When the cut product 11 includes the first and second connectors 12A and 12B as illustrated in FIG. 21, sub-step S75 includes removing the first and second connectors 12A and 12B so as to remove the first and second retained portions 51 and 52. The surfaces of the cured product 21 exposed, for example, by removing the first and second retained portions 51 and 52 and/or the first and second connectors 12A and 12B are preferably polished so as to make the surfaces of the resulting plate denture 10 smooth. Sequentially performing the above-described steps fabricates the plate denture 10 (see FIG. 1) including the denture base 20 and the artificial teeth 15.

As described above, the plate denture manufacturing method according to the present preferred embodiment includes placing, on the holder 95, the denture mold 40 including the vent holes 58, thus closing the vent holes 58 with the holder 95. The manufacturing method then includes pouring the denture base material into the forming space 48 of the denture mold 40. Because the denture mold 40 is provided with the vent holes 58, the denture base material may flow out of the denture mold 40 through the vent holes 58. However, closing the vent holes 58 with the holder 95 prevents the denture base material, which has been poured into the forming space 48, from flowing out of the denture mold 40. Bubbles may be produced during curing of the denture base material poured into the forming space 48. Because the holder 95 is higher in gas permeability than the denture mold 40, the bubbles produced in the denture base material are discharged out of the denture mold 40 through the vent holes 58 and the holder 95. The bubbles (or gas) produced during curing of the denture base material are thus discharged out of the denture base material. Consequently, the denture mold 40 is brought into more intimate contact with the denture base material so as to limit or prevent shrinkage of the denture base material, which as a result reduces or prevents occurrence of cracks or bubbles in the denture base material that has been cured.

The manufacturing method according to the present preferred embodiment includes using heat-curing resin as the denture base material. The denture base material curing step includes curing the denture base material by heating the denture base material. Heating the heat-curing resin for polymerization may produce a larger number of bubbles. Accordingly, discharging the bubbles through the vent holes 58 of the denture mold 40 and the holder 95 brings the denture mold 40 into more intimate contact with the heat-curing resin so as to more effectively limit or prevent shrinkage of the heat-curing resin.

The manufacturing method according to the present preferred embodiment includes using the bottom wall 45 and the first to fourth side walls 41 to 44 of the denture mold 40 made of acrylic resin, and the holder 95 made of silicone. Because the denture mold 40 is made of acrylic resin, the denture mold 40 and the denture base material (e.g., heat-curing resin) are more firmly bonded to each other. This enables the denture base material to be cured into a shape conforming to the forming space of the denture mold 40. Because the holder 95 is made of silicone, bubbles produced during curing of the denture base material are more reliably discharged out of the denture mold 40 through the holder 95. In particular, heating the heat-curing resin for polymerization may produce a larger number of bubbles. Accordingly, discharging the bubbles through the vent holes 58 of the denture mold 40 more effectively limits or prevents shrinkage of the heat-curing resin.

The manufacturing method according to the present preferred embodiment includes providing the vent holes 58 in the central region of the bottom wall 45 in plan view, and disposing the arc-shaped cutting target region 55 such that the cutting target region 55 surrounds the vent holes 58. Bubbles produced during curing of the denture base material tend by nature to be large in number in the central region of the denture mold 40. Accordingly, providing the vent holes 58 in the central region of the bottom wall 45 of the denture mold 40 allows the bubbles to be more reliably discharged out of the denture mold 40.

The plate denture 10 manufactured by the manufacturing method according to the present preferred embodiment may be used as a complete denture for a patient.

The manufacturing method according to the present preferred embodiment is able to suitably use the denture mold 40. The manufacturing method according to the present preferred embodiment is able to suitably use the plate denture manufacturing kit including the denture mold 40. The plate denture manufacturing kit according to one preferred embodiment includes, for example, one or more denture molds 40 and the holder 95. The plate denture manufacturing kit according to another preferred embodiment includes one or more denture molds 40, the holder 95, and the adapter 30.

The bottom wall 45 of the denture mold 40 according to the present preferred embodiment includes the cutting target region 55 to be cut by the cutting apparatus 60 so as to define the grooves 46A for the artificial teeth 15, and the vent holes 58 passing through the bottom wall 45 in the up-down direction and in communication with the forming space 48. Accordingly, the bubbles (or gas) produced in the denture base material are discharged out of the denture mold 40 through the vent holes 58. The bubbles produced during curing of the denture base material are thus discharged out of the denture base material. Consequently, the denture mold 40 is brought into more intimate contact with the denture base material so as to limit or prevent shrinkage of the denture base material, which as a result reduces or prevents occurrence of cracks or bubbles in the denture base material that has been cured.

Second Preferred Embodiment

A second preferred embodiment of the present invention is similar to the first preferred embodiment expect that an adapter 130, a denture mold 140, and a holder 195, which are used to manufacture a plate denture 10, are respectively different from the adapter 30, the denture mold 40, and the holder 95 used in the first preferred embodiment. A plate denture manufacturing method according to the second preferred embodiment, which uses the adapter 130, the denture mold 140, and the holder 195, will also achieve effects similar to those achieved by the plate denture manufacturing method according to the first preferred embodiment. In the following description of the second preferred embodiment, components similar to those of the first preferred embodiment will be identified by the same reference signs, and description thereof will be omitted or simplified when redundant.

Figure 22:
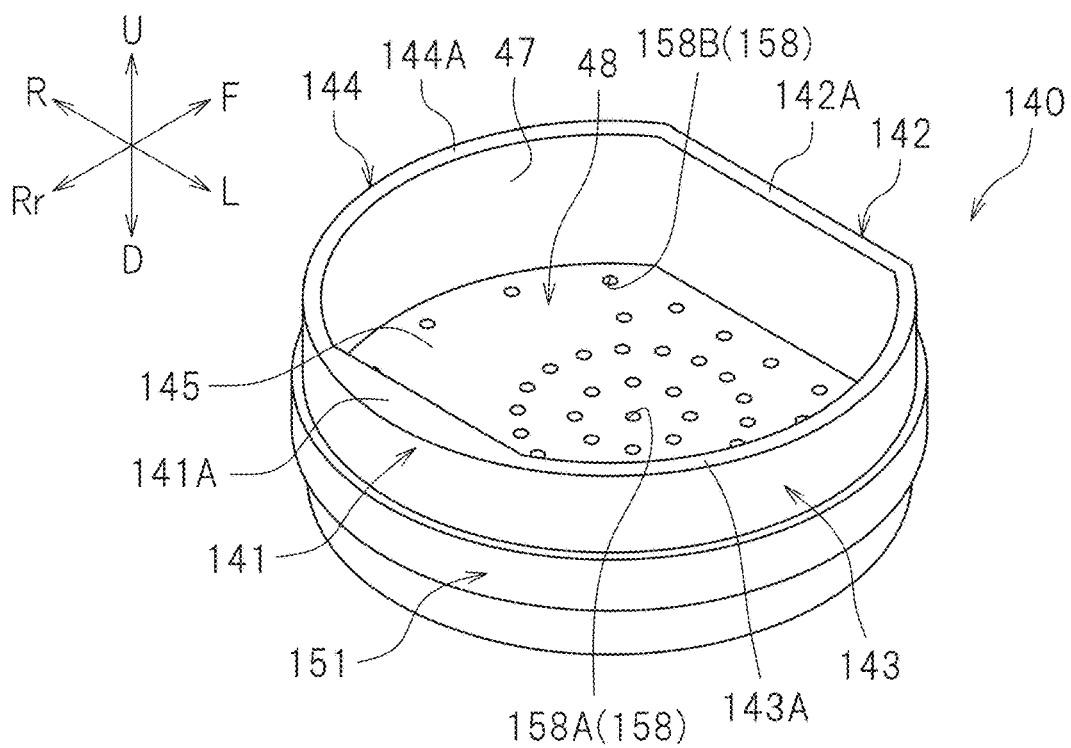
FIG. 22 is a perspective view of a denture mold according to a second preferred embodiment of the present invention.

FIG. 22 is a perspective view of the denture mold 140 according to the second preferred embodiment. A denture mold preparing step (step S20) according to the second preferred embodiment includes preparing the denture mold 140. The denture mold 140 is different in structure from the denture mold 40 but is similar in, for example, usage, function, and material to the denture mold 40. The denture mold 140 is indirectly attachable to a cutting apparatus 60 (see FIG. 12) through the adapter 130 (see FIG. 28).

Figure 23:
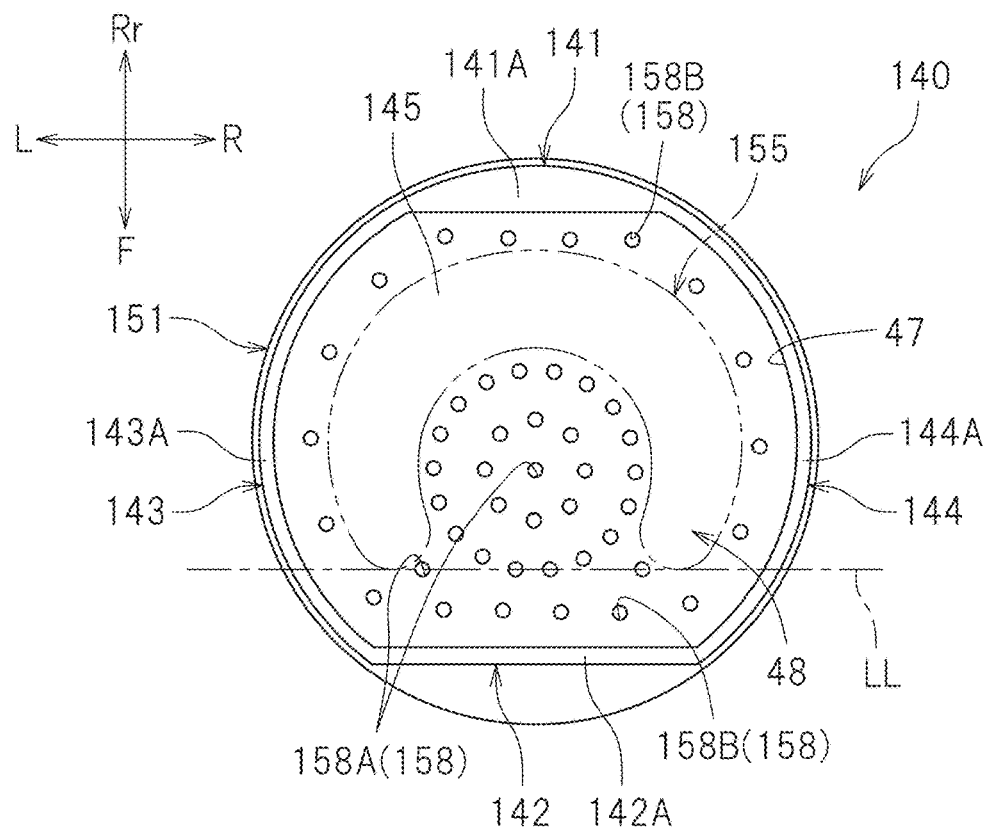
FIG. 23 is a top view of the denture mold according to the second preferred embodiment of the present invention.

As illustrated in FIG. 23, the denture mold 140 has a circular shape in plan view. The denture mold 140 includes a bottom wall 145, a first side wall 141, a second side wall 142, a third side wall 143, and a fourth side wall 144. The bottom wall 145 includes a flat surface. The first side wall 141 extends upward from the rear portion of the bottom wall 145. The second side wall 142 extends upward from the front portion of the bottom wall 145. The first side wall 141 and the second side wall 142 face each other. The third side wall 143 extends upward from the left portion of the bottom wall 145. The third side wall 143 connects the left end of the first side wall 141 with the left end of the second side wall 142. The third side wall 143 is curved away from the fourth side wall 144. The fourth side wall 144 extends upward from the right portion of the bottom wall 145. The fourth side wall 144 connects the right end of the first side wall 141 with the right end of the second side wall 142. The fourth side wall 144 is curved away from the third side wall 143. The third side wall 143 and the fourth side wall 144 face each other. The first side wall 141 includes an upper surface 141A. The second side wall 142 includes an upper surface 142A. The third side wall 143 includes an upper surface 143A. The fourth side wall 144 includes an upper surface 144A. The upper surfaces 141A, 142A, 143A, and 144A are flush with each other. The upper surfaces 141A to 144A are thus equal in height from the bottom wall 145. In the present preferred embodiment, the first to fourth side walls 141 to 144 are each an example of a side wall extending upward from the bottom wall 145.

As illustrated in FIG. 22, the denture mold 140 includes an opening 47 and a forming space 48. The forming space 48 is surrounded by the bottom wall 145, the first side wall 141, the second side wall 142, the third side wall 143, and the fourth side wall 144.

As illustrated in FIG. 23, the bottom wall 145 includes a cutting target region 155 that is to be cut by the cutting apparatus 60 (see FIG. 12) so as to define grooves 46A (see FIG. 16) for artificial teeth 15, and a plurality of vent holes 158 (see also FIG. 22) passing through the bottom wall 145 in an up-down direction and in communication with the forming space 48. The grooves 46A are defined in the cutting target region 155 in step S30. The cutting target region 155 has an arc shape. The cutting target region 155 is located to surround inner vent holes 158A (which will be described below). The vent holes 158 include the inner vent holes 158A defined in the central region of the bottom wall 145 in plan view, and outer vent holes 158B defined outward of the cutting target region 155 in plan view. Some of the inner vent holes 158A are located inward of the cutting target region 155 and at least partially rearward of a straight line LL passing through the right and left front ends of the cutting target region 155. All of the inner vent holes 158A may be located inward of the cutting target region 155. In the present preferred embodiment, the bottom wall 145 is provided with 29 inner vent holes 158A and 18 outer vent holes 158B. Alternatively, the bottom wall 145 may be provided with any other suitable number of inner vent holes 158A and any other suitable number of outer vent holes 158B. Although the inner vent holes 158A are disposed radially in the present preferred embodiment, the inner vent holes 158A may be disposed in any other suitable manner. The vent holes 158 may each have a diameter of between about 2 mm and about 4 mm, or a diameter of, for example, about 2.5 mm. The vent holes 158 may each have any other suitable diameter. The percentage of area of the bottom wall 145 occupied by the vent holes 158 (i.e., the percentage of opening area of the bottom wall 145) is between about 3% and about 8%, or may be, for example, between about 4% and about 5% inclusive.

Figure 24:
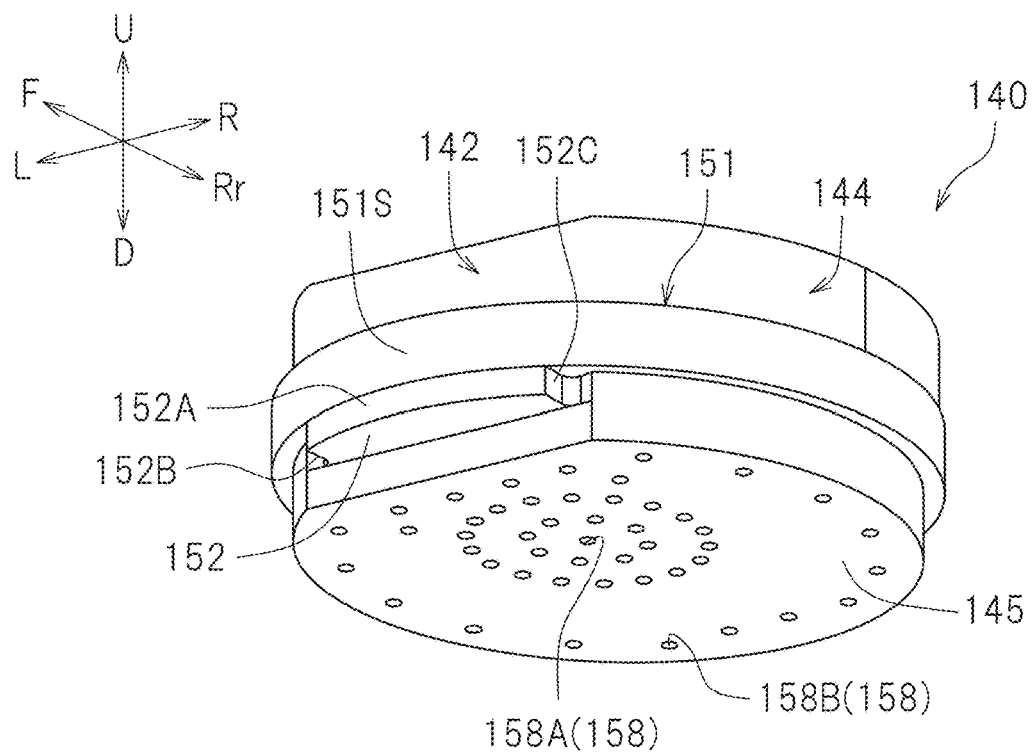
FIG. 24 is a perspective view of the denture mold according to the second preferred embodiment of the present invention.
Figure 25:
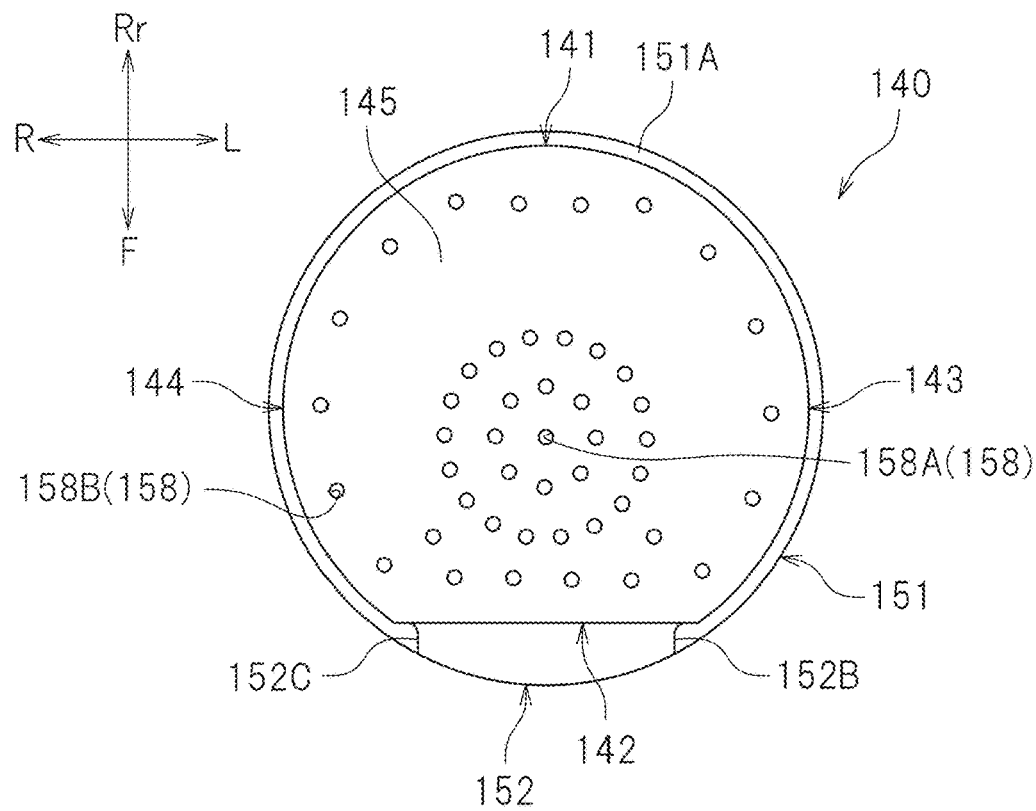
FIG. 25 is a bottom view of the denture mold according to the second preferred embodiment of the present invention.

As illustrated in FIG. 22, the denture mold 140 includes a retained portion 151 and a protrusion 152 (see FIG. 24) extending downward from the retained portion 151. The retained portion 151 is to be retained by the adapter 130. The protrusion 152 is to be placed in a cut-out 138 (see FIG. 29) of the adapter 130. The cut-out 138 will be described below. The retained portion 151 is to be retained by the cutting apparatus 60 through the adapter 130. As illustrated in FIG. 23, the retained portion 151 has a circular outer shape in plan view. The retained portion 151 is disposed along the first side wall 141, the second side wall 142, the third side wall 143, and the fourth side wall 144 of the denture mold 140. In other words, the retained portion 151 is disposed along the entire circumference of the denture mold 140. The protrusion 152 is disposed on the front portion of the second side wall 142 and under the retained portion 151. As illustrated in FIG. 25, the protrusion 152 extends forward from the second side wall 142. The protrusion 152 includes a front surface 152A (see FIG. 24). The retained portion 151 includes a side surface 151S. The front surface 152A and the side surface 151S are flush with each other. The protrusion 152 includes a first locked surface 152B and a second locked surface 152C to be locked by a body 132 (which will be described below) of the adapter 130.

Figure 26:
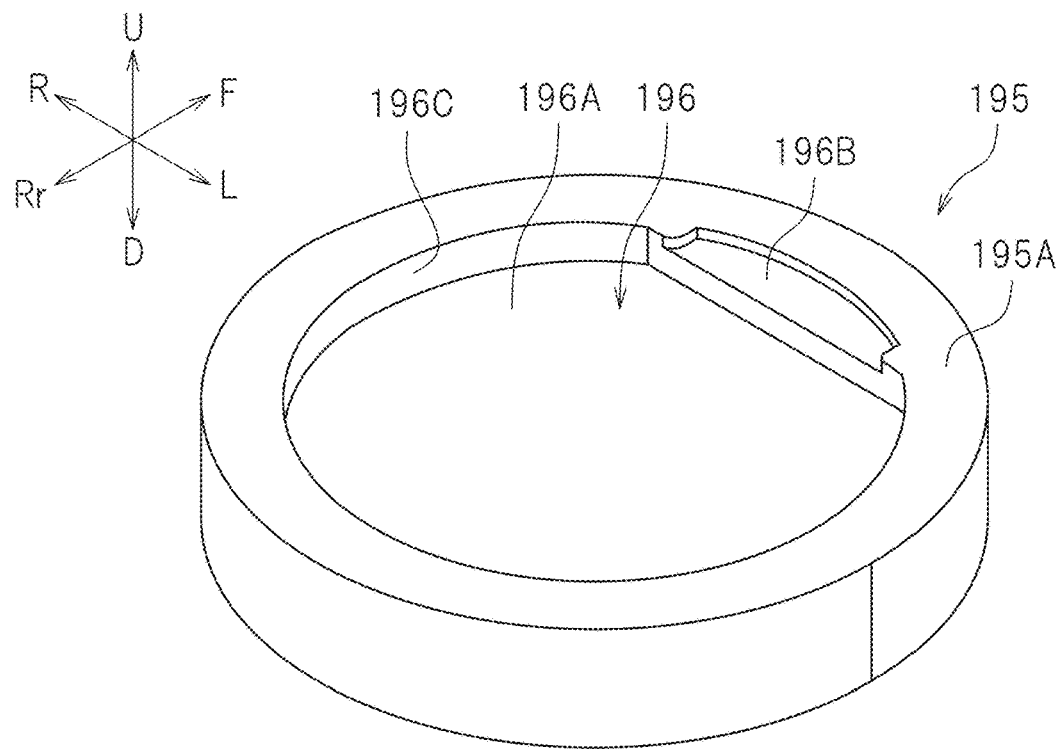
FIG. 26 is a perspective view of a holder according to the second preferred embodiment of the present invention.

FIG. 26 is a perspective view of the holder 195 according to the second preferred embodiment. A denture mold placing step (step S40) according to the second preferred embodiment includes placing, on the holder 195, the denture mold 140 in which the grooves 46A have been cut. The denture mold 140 is placed on the holder 195 so as to close the vent holes 158 defined in the bottom wall 145 of the denture mold 140. The holder 195 is different in structure from the holder 95 but is similar in, for example, usage, function, and material to the holder 95.

Figure 27:
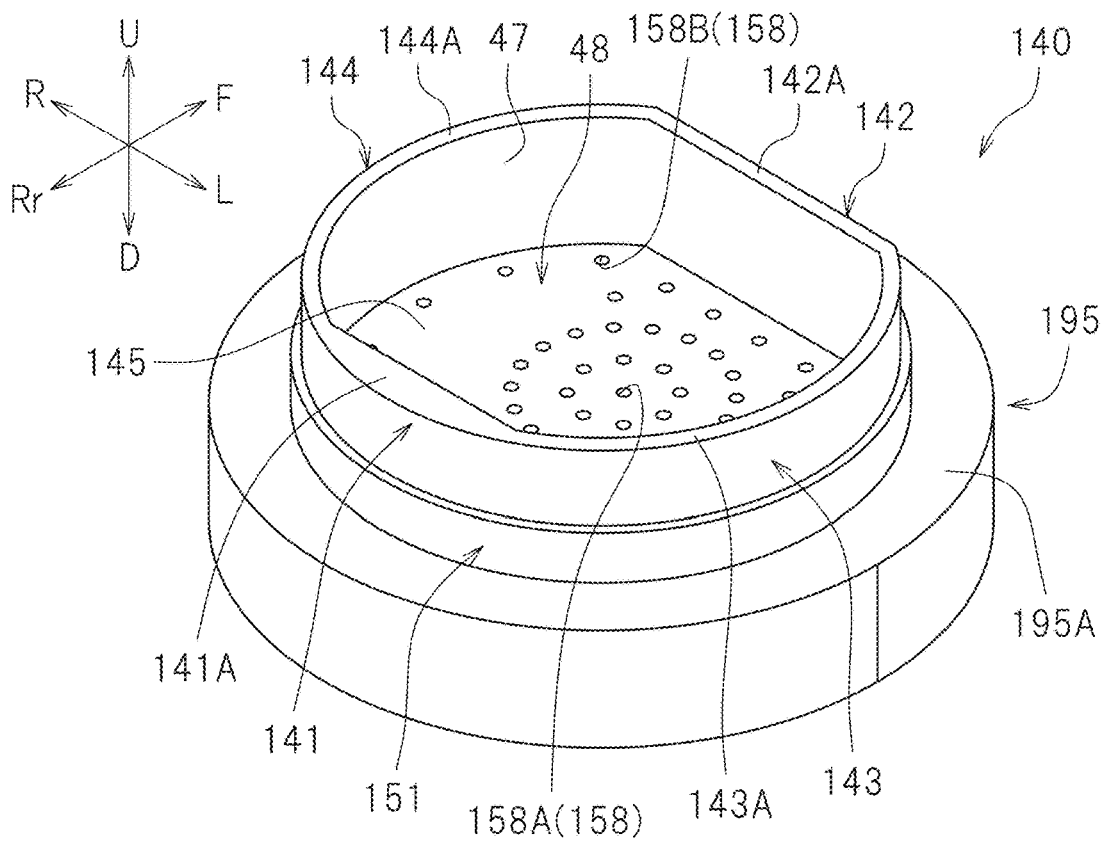
FIG. 27 is a perspective view of the holder according to the second preferred embodiment of the present invention, with the denture mold placed on the holder.

As illustrated in FIG. 26, the holder 195 has a substantially circular cylindrical shape. The holder 195 includes an upper surface 195A provided with a recess 196 recessed downward. FIG. 27 is a perspective view of the holder 195, with the denture mold 140 placed on the holder 195. As illustrated in FIG. 27, the denture mold 140 is fitted into the recess 196. The recess 196 conforms to the outer shape of the denture mold 140. The bottom of the denture mold 140 is fitted into the recess 196. With the denture mold 140 fitted into the recess 196, a lower surface 151A (see FIG. 25) of the retained portion 151, for example, is in contact with the upper surface 195A of the holder 195. As illustrated in FIG. 26, the recess 196 includes a first portion 196A that comes into contact with the bottom wall 145 of the denture mold 140, a second portion 196B that comes into contact with the protrusion 152, and a third portion 196C that comes into contact with the lower ends of the first to fourth side walls 141 to 144 of the denture mold 140. The second portion 196B is located above the first portion 196A. The recess 196 (or more specifically, the third portion 196C) has a depth of, for example, between about 5 mm and about 20 mm. In the example illustrated in FIG. 27, the grooves 46A defined in the bottom wall 145 are not illustrated.

Figure 28:
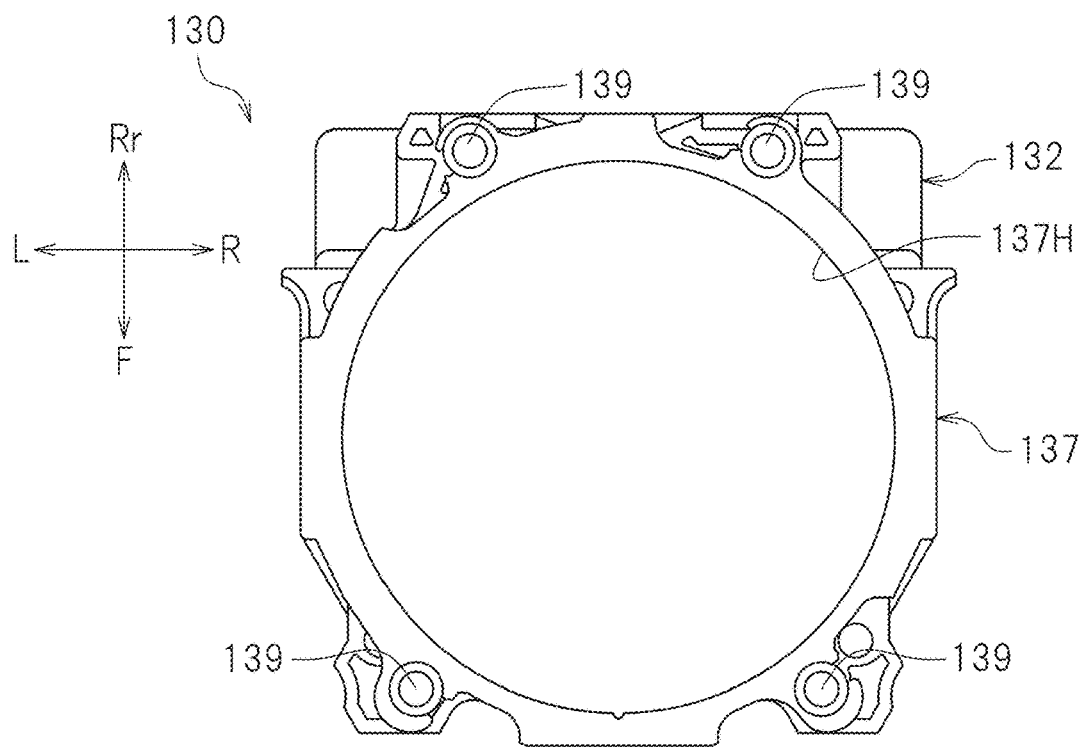
FIG. 28 is a plan view of an adapter according to the second preferred embodiment of the present invention.

FIG. 28 is a plan view of the adapter 130 according to the second preferred embodiment. The denture mold cutting step (step S30) and one-piece product machining step (step S70) according to the second preferred embodiment involve attaching the denture mold 140 to the adapter 130. The denture mold 140 is retained by the cutting apparatus 60 through the adapter 130. The adapter 130 is a fixture to attach the denture mold 140 to the cutting apparatus 60. The adapter 130 includes the body 132 and a retaining plate 137. The body 132 is an example of the first structure. The retaining plate 137 is an example of the second structure. The denture mold 140 is clamped between the body 132 and the retaining plate 137. The retained portion 151 of the denture mold 140 is retained by the adapter 130.

Figure 29:
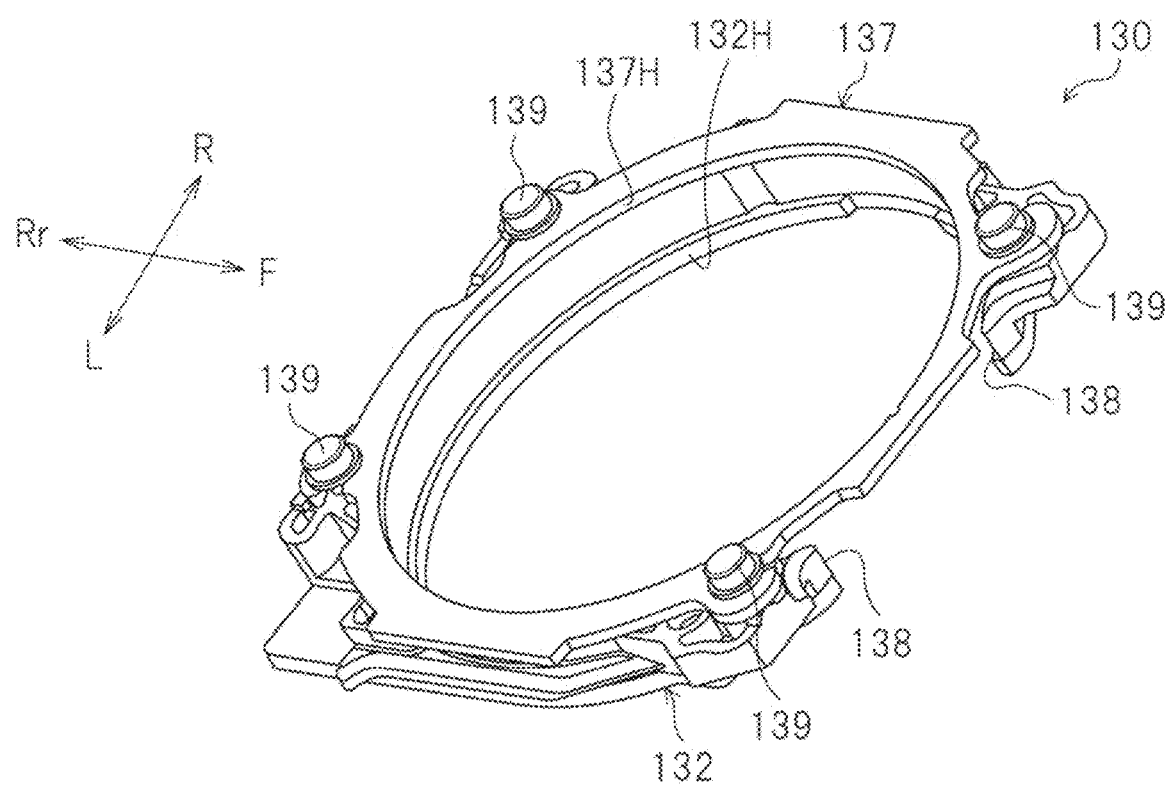
FIG. 29 is a perspective view of the adapter according to the second preferred embodiment of the present invention.
Figure 30:
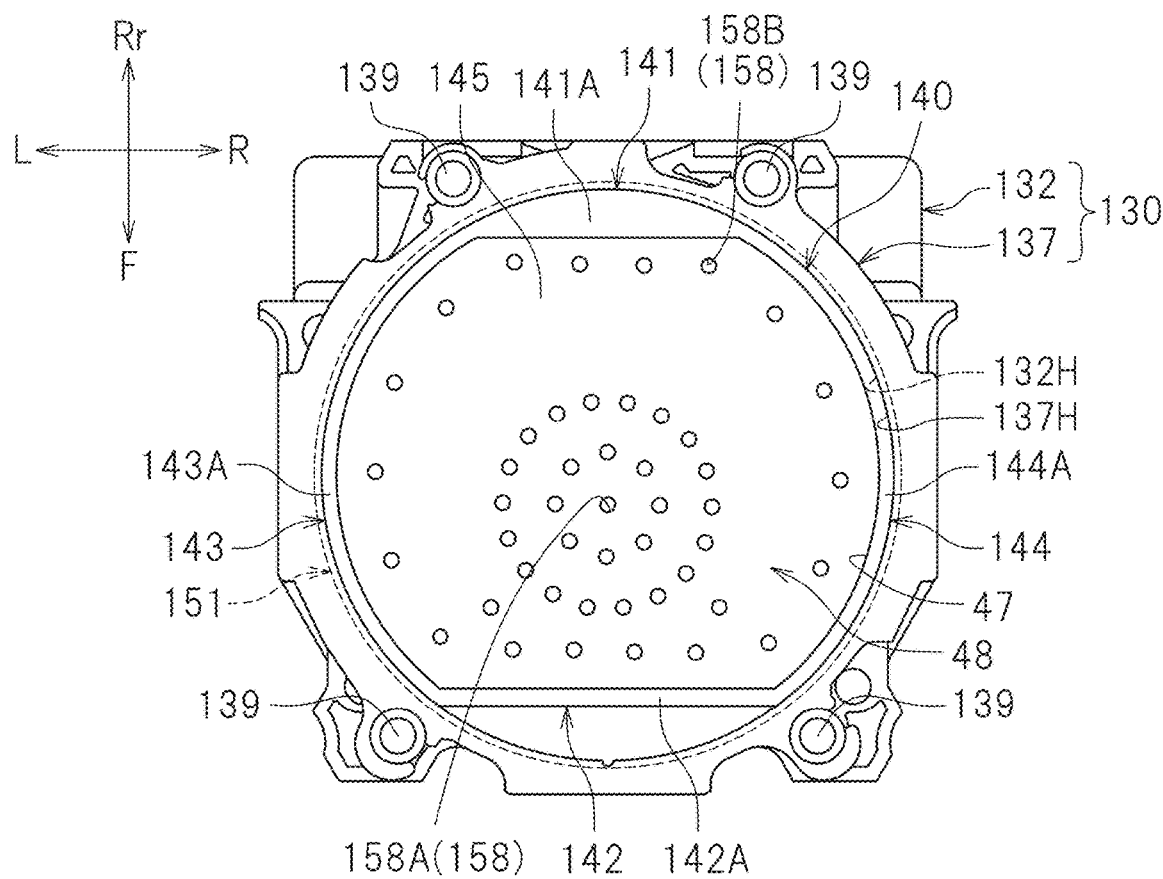
FIG. 30 is a plan view of the adapter according to the second preferred embodiment of the present invention, with the denture mold retained by the adapter.
Figure 31:
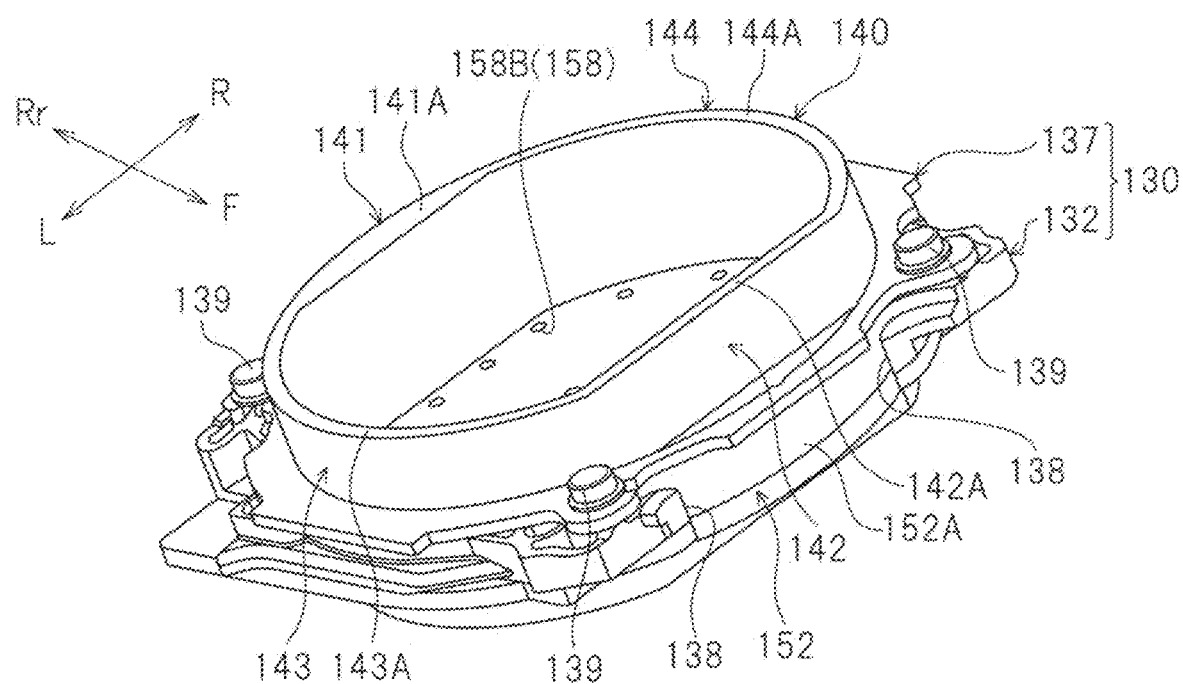
FIG. 31 is a perspective view of the adapter according to the second preferred embodiment of the present invention, with the denture mold retained by the adapter.
Figure 32:
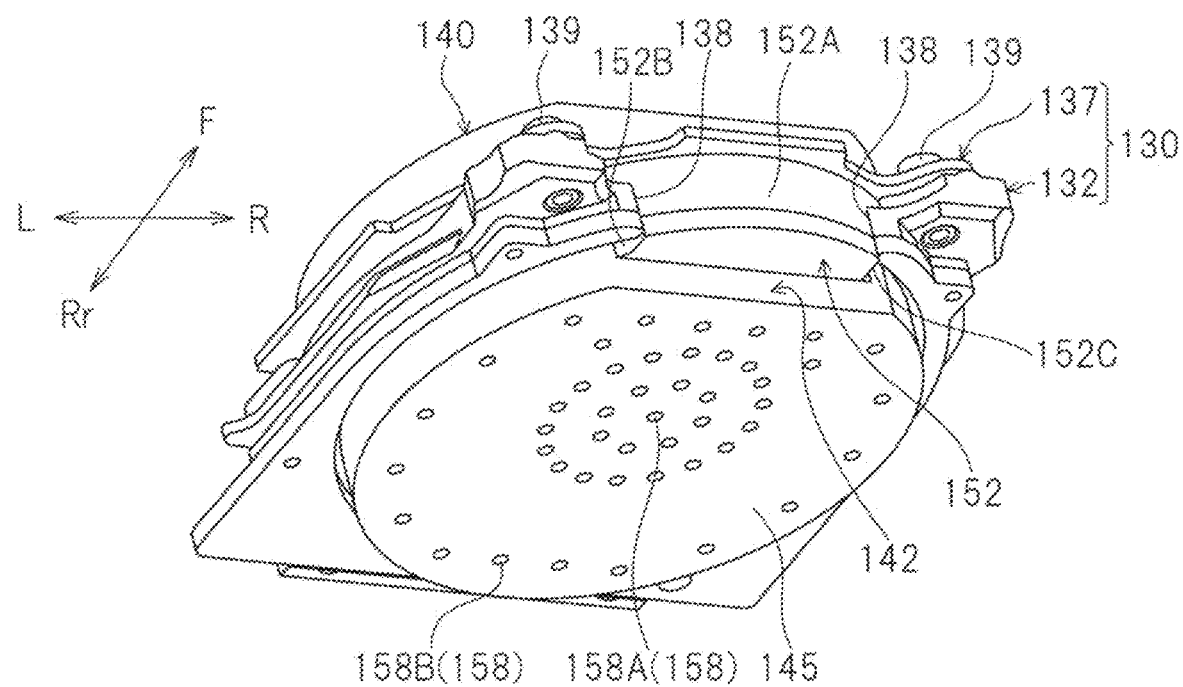
FIG. 32 is another perspective view of the adapter according to the second preferred embodiment of the present invention, with the denture mold retained by the adapter.

As illustrated in FIG. 29, the body 132 has an arc shape. The body 132 retains the denture mold 140 from below. The body 132 includes the cut-out 138. An opening 132H is defined in the body 132. The opening 132H is continuous with the cut-out 138. As illustrated in FIG. 30, the forming space 48 (see also FIG. 22) of the denture mold 140 is disposed in the opening 132H. As illustrated in FIGS. 31 and 32, the protrusion 152 of the denture mold 140 is disposed in the cut-out 138. In this state, the first and second locked surfaces 152B and 152C of the protrusion 152 are locked by the body 132.

As illustrated in FIG. 29, the retaining plate 137 has an annular outer shape. The retaining plate 137 is detachably attached to the body 132. The retaining plate 137 presses the denture mold 140 against the body 132 from above. An opening 137H is defined in the retaining plate 137. The forming space 48 (see FIG. 22) of the denture mold 140 is disposed in the opening 137H. The retaining plate 137 is fastened to the body 132 with screws 139, but the denture mold 140 is not fastened to the body 132 with the screws 139. As illustrated in FIG. 31, the body 132 and the retaining plate 137 are fastened to each other with the screws 139, with the denture mold 140 retained by the body 132 and pressed by the retaining plate 137. The retained portion 151 of the denture mold 140 is thus clamped between the body 132 and the retaining plate 137. In the present preferred embodiment, the denture mold 140 is stably retained by the adapter 130. Placing the protrusion 152 in the cut-out 138 facilitates the positioning of the denture mold 140 with respect to the adapter 130. Consequently, the denture mold 140 is prevented from being attached to the adapter 130 in a wrong direction.

The manufacturing method according to the present preferred embodiment includes providing the vent holes 158 including the inner vent holes 158A defined in the central region of the bottom wall 145 in plan view, and disposing the arc-shaped cutting target region 155 such that the cutting target region 155 surrounds the inner vent holes 158A. Bubbles produced during curing of the denture base material tend by nature to be large in number in the central region of the denture mold 140. Accordingly, providing the inner vent holes 158A in the central region of the bottom wall 145 of the denture mold 140 allows the bubbles to be more reliably discharged out of the denture mold 140.

The manufacturing method according to the present preferred embodiment includes providing the vent holes 158 including the outer vent holes 158B disposed outward of the cutting target region 155 in plan view. This allows bubbles to be discharged out of an entirety of the denture mold 140.

The denture mold cutting step of the manufacturing method according to the present preferred embodiment includes disposing the protrusion 152 of the denture mold 140 in the cut-out 138 of the adapter 130 so as to attach the denture mold 140 to the adapter 130 and then indirectly attach the denture mold 140 to the cutting apparatus 60 through the adapter 130. The cut-out 138 and the protrusion 152 thus facilitate the positioning of the denture mold 140 with respect to the adapter 130.

The preferred embodiments of the present invention have been described thus far. The preferred embodiments described above, however, are only illustrative. The present invention may be embodied in various other forms.

The manufacturing methods according to the first and second preferred embodiments described above involve using the denture molds 40 and 140, respectively, so as to manufacture the plate denture 10 that is a complete denture for the upper jaw. The manufacturing methods disclosed herein may be used to manufacture any other type of denture. The manufacturing methods disclosed herein may be used to manufacture, for example, a complete denture for the lower jaw or a partial denture. The manufacturing methods disclosed herein may be used to manufacture a "non-clasp denture" made of, for example, highly elastic thermoplastic resin and including no metal clasp. The denture molds 40 and 140 may each be made of any suitable material and may each have any suitable shape.

In the first preferred embodiment described above, the vent holes 58 are defined in the bottom wall 45. Alternatively, the vent holes 58 may be defined at any other location or locations on the denture mold 40. In one example, the vent holes 58 may be defined in at least one of the first to fourth side walls 41 to 44 in addition to the bottom wall 45. In this case, the holder 95 has a shape that is able to close the vent holes 58 defined in the bottom wall 45 and at least one of the first to fourth side walls 41 to 44. In another example, the vent holes 58 may be defined in at least one of the first to fourth side walls 41 to 44 instead of the bottom wall 45. In this case, the holder 95 has a shape that is able to close the vent holes 58 defined in at least one of the first to fourth side walls 41 to 44. In the second preferred embodiment described above, the vent holes 158 are defined in the bottom wall 145. Alternatively, the vent holes 158 may be defined at any other location or locations on the denture mold 140. In one example, the vent holes 158 may be defined in at least one of the first to fourth side walls 141 to 144 in addition to the bottom wall 145. In this case, the holder 195 has a shape that is able to close the vent holes 158 defined in the bottom wall 145 and at least one of the first to fourth side walls 141 to 144. In another example, the vent holes 158 may be defined in at least one of the first to fourth side walls 141 to 144 instead of the bottom wall 145. In this case, the holder 195 has a shape that is able to close the vent holes 158 defined in at least one of the first to fourth side walls 141 to 144.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principles of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for manufacturing a plate denture including a denture base and an artificial tooth placed on the denture base, the method comprising:
    preparing three-dimensional data for an artificial tooth impression that is an impression for the artificial tooth to be placed on the denture base, and three-dimensional data for the plate denture;
    preparing a denture mold including a bottom wall, a side wall extending upward from the bottom wall, a forming space which is surrounded by the bottom wall and the side wall and into which a denture base material is to be poured, a retained portion disposed on the side wall and to be directly or indirectly attached to a cutting apparatus, a cutting target region located in the bottom wall and to be cut by the cutting apparatus so as to define a groove for the artificial tooth, and a plurality of vent holes defined in the bottom wall, passing through the bottom wall in an up-down direction, and in communication with the forming space;
    cutting the denture mold including directly or indirectly attaching the denture mold to the cutting apparatus through the retained portion, and cutting the groove in the cutting target region in accordance with the three-dimensional data for the artificial tooth impression;
    placing the grooved denture mold on a holder so as to close the plurality of vent holes, the holder being higher in gas permeability than the denture mold;
    placing the artificial tooth in the groove;
    curing the denture base material including pouring the denture base material into the forming space, with the artificial tooth placed in the groove, and curing the denture base material so as to fabricate a one-piece product including the denture mold, the artificial tooth, and a cured product of the denture base material that are integral with each other; and
    machining the one-piece product including directly or indirectly attaching the one-piece product to the cutting apparatus through the retained portion, and machining the cured product in accordance with the three-dimensional data for the plate denture.

2. The manufacturing method according to claim 1, wherein
    the denture base material is heat-curing resin; and
    the curing the denture base material includes heating the denture base material.

3. The manufacturing method according to claim 1, wherein
    the denture mold is made of acrylic resin; and
    the holder is made of silicone.

4. The manufacturing method according to claim 1, wherein
the plurality of vent holes include an inner vent hole disposed in a central region of the bottom wall in plan view; and
the cutting target region has an arc shape and is disposed to surround the inner vent hole.

5. The manufacturing method according to claim 4, wherein the plurality of vent holes include an outer vent hole disposed outward of the cutting target region in plan view.

6. The manufacturing method according to claim 1, wherein
the preparing the denture mold includes preparing the denture mold to include a protrusion extending downward from the retained portion; and
the cutting the denture mold includes:
preparing an adapter to retain the denture mold, the adapter including a first structure having an arc shape and a second structure having a ring shape, the first structure including a cut-out, the second structure being detachable from and attachable to the first structure such that the retained portion is clamped between the first and second structures; and
placing the protrusion in the cut-out of the adapter so as to attach the denture mold to the adapter and then indirectly attach the denture mold to the cutting apparatus through the adapter.

7. A denture mold for manufacture of a plate denture including a denture base and an artificial tooth placed on the denture base, the denture mold comprising:
a bottom wall;
a side wall extending upward from the bottom wall;
a forming space which is surrounded by the bottom wall and the side wall and into which a denture base material is to be poured; and
a retained portion disposed on the side wall and to be directly or indirectly attached to a cutting apparatus; wherein the bottom wall includes:
a cutting target region to be cut by the cutting apparatus so as to define a groove for the artificial tooth; and
a plurality of vent holes passing through the bottom wall in an up-down direction and in communication with the forming space.

8. The denture mold according to claim 7, wherein
the plurality of vent holes include an inner vent hole disposed in a central region of the bottom wall in plan view; and
the cutting target region has an arc shape and is disposed to surround the inner vent hole.

9. The denture mold according to claim 8, wherein the plurality of vent holes include an outer vent hole disposed outward of the cutting target region in plan view.

10. The denture mold according to claim 7, wherein
the bottom wall and the side wall of the denture mold are made of acrylic resin; and
the denture base material to be poured into the forming space is heat-curing resin.

11. The denture mold according to claim 7, further comprising:
a protrusion extending downward from the retained portion; wherein
the denture mold is configured to be held by an adapter that includes a first structure having an arc shape and a second structure portion a ring shape, the first structure including a cut-out, the second structure being detachable from and attachable to the first structure such that the retained portion is clamped between the first and second structures; and
with the denture mold retained by the adapter, the protrusion is located in the cut-out.

12. A plate denture manufacturing kit comprising:
the denture mold according to claim 7; and
a holder on which the denture mold is to be placed, the holder being configured to close the plurality of vent holes; wherein
the holder is higher in gas permeability than the denture mold.

13. The plate denture manufacturing kit according to claim 12, wherein the holder is made of silicone.

\* \* \* \* \*